(12) United States Patent
Gould et al.

(10) Patent No.: US 9,972,039 B2
(45) Date of Patent: *May 15, 2018

(54) METHOD AND SYSTEM FOR COLLABORATIVE AND PRIVATE SESSIONS

(71) Applicant: eBay Inc., San Jose, CA (US)

(72) Inventors: Helen M. Gould, Oakland, CA (US); Edward O'Neil Garcia, Redwood City, CA (US); Ryan Melcher, Ben Lomond, CA (US); Diego Lagunas, San Jose, CA (US); ALvaro Bolivar, San Francisco, CA (US); Jennifer T. Anderson, San Jose, CA (US); Karenina Susilo, San Jose, CA (US); Ryan Spoon, Santa Clara, CA (US); Alan Lewis, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/175,911

(22) Filed: Jun. 7, 2016

(65) Prior Publication Data

US 2016/0292762 A1    Oct. 6, 2016

Related U.S. Application Data

(63) Continuation of application No. 14/567,833, filed on Dec. 11, 2014, now Pat. No. 9,378,523, which is a
(Continued)

(51) Int. Cl.
*G06F 15/00* (2006.01)
*G06F 13/00* (2006.01)
(Continued)

(52) U.S. Cl.
CPC ..... *G06Q 30/0613* (2013.01); *G06F 3/04812* (2013.01); *G06F 3/04842* (2013.01);
(Continued)

(58) Field of Classification Search
CPC .............................. G06Q 10/10; G06Q 30/06
(Continued)

(56) References Cited

U.S. PATENT DOCUMENTS

| 4,650,978 A | 3/1987 | Hudson et al. |
| 5,991,796 A | 11/1999 | Anupam et al. |

(Continued)

FOREIGN PATENT DOCUMENTS

| JP | 2001155257 A | 6/2001 |
| JP | 2002092411 A | 3/2002 |

(Continued)

OTHER PUBLICATIONS

"U.S. Appl. No. 10/958,197, Appeal Brief filed Aug. 29, 2014", 23 pgs.
(Continued)

*Primary Examiner* — Kevin Nguyen
(74) *Attorney, Agent, or Firm* — Schwegman Lundberg & Woessner, P.A.

(57) ABSTRACT

Examples of a method and system for collaborative and private sessions are provided. A request from a user of a collaborative shopping session is received. The user is associated with a private shopping session that allows access to an item at a special price, the special price being unavailable to non-participants of the private shopping session. Criterion is designated for the private session, the criterion indicating a completion of the private shopping session. User interactions received from a device of the user are processed. Satisfaction of the criterion is determined as a result of the processing. The private shopping session for the user is concluded based on the determination.

22 Claims, 20 Drawing Sheets

Related U.S. Application Data continuation of application No. 13/033,504, filed on Feb. 23, 2011, now Pat. No. 8,914,737, which is a continuation of application No. 11/700,662, filed on Jan. 31, 2007, now Pat. No. 7,913,178.

(51) Int. Cl.

| | | |
|---|---|---|
| *G06Q 30/06* | (2012.01) | |
| *G06Q 10/10* | (2012.01) | |
| *H04L 29/08* | (2006.01) | |
| *G06F 3/0481* | (2013.01) | |
| *H04L 12/58* | (2006.01) | |
| *G06F 3/0484* | (2013.01) | |
| *G06Q 20/12* | (2012.01) | |
| *G06Q 20/22* | (2012.01) | |

(52) U.S. Cl.
CPC ............ *G06Q 10/10* (2013.01); *G06Q 20/12* (2013.01); *G06Q 20/29* (2013.01); *G06Q 30/06* (2013.01); *G06Q 30/0601* (2013.01); *G06Q 30/0641* (2013.01); *H04L 51/04* (2013.01); *H04L 67/02* (2013.01); *H04L 67/20* (2013.01); *H04L 67/22* (2013.01)

(58) Field of Classification Search
USPC .................... 715/762, 853, 771–715, 855
See application file for complete search history.

(56) References Cited

U.S. PATENT DOCUMENTS

| | | | |
|---|---|---|---|
| 6,370,514 | B1 | 4/2002 | Messner |
| 7,392,222 | B1 | 6/2008 | Hamilton et al. |
| 7,401,731 | B1 | 7/2008 | Pletz et al. |
| 7,584,126 | B1 | 9/2009 | White |
| 7,913,178 | B2 | 3/2011 | Helen et al. |
| 8,319,728 | B2 * | 11/2012 | Geffin ................... G06F 3/038 345/157 |
| 8,914,737 | B2 | 12/2014 | Gould et al. |
| 9,378,523 | B2 | 6/2016 | Gould et al. |
| 2001/0054064 | A1 | 12/2001 | Kannan |
| 2002/0055878 | A1 | 5/2002 | Burton et al. |
| 2002/0133459 | A1 | 9/2002 | Polk et al. |
| 2002/0152123 | A1 | 10/2002 | Giordano et al. |
| 2003/0097331 | A1 | 5/2003 | Cohen |
| 2003/0167195 | A1 | 9/2003 | Fernandes |
| 2003/0187787 | A1 | 10/2003 | Freund |
| 2003/0216996 | A1 * | 11/2003 | Cummings ............ G06Q 20/02 705/39 |
| 2004/0039775 | A1 | 2/2004 | Yoshida |
| 2004/0044589 | A1 | 3/2004 | Inoue et al. |
| 2004/0148228 | A1 | 7/2004 | Kwei |
| 2004/0210498 | A1 | 10/2004 | Freund |
| 2005/0038736 | A1 | 2/2005 | Saunders |
| 2005/0096997 | A1 | 5/2005 | Jain et al. |
| 2005/0228750 | A1 | 10/2005 | Olliphant et al. |
| 2006/0064378 | A1 | 3/2006 | Clementz et al. |
| 2006/0085253 | A1 | 4/2006 | Mengerink et al. |
| 2006/0122895 | A1 | 6/2006 | Abraham et al. |
| 2006/0173702 | A1 | 8/2006 | Saxena et al. |
| 2006/0235764 | A1 | 10/2006 | Bamborough et al. |
| 2007/0194113 | A1 | 8/2007 | Esplin et al. |
| 2007/0239493 | A1 | 10/2007 | Sweetland et al. |
| 2007/0288355 | A1 | 12/2007 | Roland et al. |
| 2008/0010215 | A1 | 1/2008 | Rackley, III et al. |
| 2008/0162295 | A1 | 7/2008 | Bedier |
| 2008/0183619 | A1 | 7/2008 | Gould et al. |
| 2008/0183819 | A1 | 7/2008 | Gould et al. |
| 2011/0145106 | A1 | 6/2011 | Gould et al. |
| 2012/0265676 | A1 | 10/2012 | Gould et al. |
| 2015/0095201 | A1 | 4/2015 | Gould et al. |

FOREIGN PATENT DOCUMENTS

| | | | |
|---|---|---|---|
| JP | 2002133205 | A | 5/2002 |
| JP | 2003016231 | A | 1/2003 |
| JP | 2003022369 | A | 1/2003 |
| JP | 2003132222 | A | 5/2003 |
| JP | 2003132236 | A | 5/2003 |
| JP | 2003150866 | A | 5/2003 |
| JP | 2003187281 | A | 7/2003 |
| JP | 2003228683 | A | 8/2003 |
| JP | 2005108031 | A | 4/2005 |
| JP | 2005530244 | A | 10/2005 |
| JP | 2006243795 | A | 9/2006 |
| JP | 6026492 | B2 | 11/2016 |
| KR | 20010087572 | A | 9/2001 |
| KR | 20020021488 | A | 3/2002 |
| WO | WO-08094522 | A3 | 8/2008 |
| WO | WO-2008094522 | A2 | 8/2008 |
| WO | WO-2008094531 | A2 | 8/2008 |
| WO | WO-2008094531 | A3 | 8/2008 |

OTHER PUBLICATIONS

"U.S. Appl. No. 10/968,197, Advisory Action dated Jun. 5, 2014", 3 pgs.

"U.S. Appl. No. 10/968,197, Decision on Pre-Appeal Brief Request dated Jul. 31, 2014", 2 pgs.

"U.S. Appl. No. 10/968,197, Examiner's Answer dated Dec. 23, 2014", 28 pgs.

"U.S. Appl. No. 10/968,197, Final Office Action dated Mar. 26, 2014", 25 pgs.

"U.S. Appl. No. 10/968,197, Final Office Action dated May 12, 2010", 30 pgs.

"U.S. Appl. No. 10/968,197, Non Final Office Action dated Sep. 10, 2013", 19 pgs.

"U.S. Appl. No. 10/968,197, Non-Final Office Action dated Oct. 16, 2009", 17 pgs.

"U.S. Appl. No. 10/968,197, Pre-Appeal Brief Request filed Jun. 18, 2014", 5 pgs.

"U.S. Appl. No. 10/968,197, Reply Brief filed Feb. 23, 2015", 14 pgs.

"U.S. Appl. No. 10/968,197, Response filed Jan. 10, 2014 to Non Final Office Action dated Sep. 10, 2013", 15 pgs.

"U.S. Appl. No. 10/968,197, Response filed Jan. 19, 2010 to Non Final Office Action dated Oct. 16, 2009", 16 pgs.

"U.S. Appl. No. 10/968,197, Response filed May 27, 2014 to Final Office Action dated Mar. 26, 2014", 17 pgs.

"U.S. Appl. No. 10/968,197, Response filed Sep. 13, 2010 to Final Office Action dated May 12, 2010", 16 pgs.

"U.S. Appl. No. 11/700,444, Advisory Action dated Apr. 5, 2016", 3 pgs.

"U.S. Appl. No. 11/700,444, Advisory Action dated Jul. 9, 2010", 3 pgs.

"U.S. Appl. No. 11/700,444, Advisory Action dated Aug. 11, 2009", 3 pgs.

"U.S. Appl. No. 11/700 444, Appeal Brief filed Jun. 22, 2011", 19 pgs.

"U.S. Appl. No. 11/700,444, Appeal Decision dated Nov. 28, 2014", 14 pgs.

"U.S. Appl. No. 11/700,444, Decision on Pre-Appeal Brief Request dated May 26, 2011", 2 pgs.

"U.S. Appl. No. 11/700,444, Examiner's Answer to Appeal Brief dated Aug. 29, 2011", 15 pgs.

"U.S. Appl. No. 11/700,444, Final Office Action dated Feb. 17, 2011", 15 pgs.

"U.S. Appl. No. 11/700,444, Final Office Action dated Apr. 29, 2010", 14 pgs.

"U.S. Appl. No. 11/700,444, Final Office Action dated May 12, 2009", 9 pgs.

"U.S. Appl. No. 11/700,444, Final Office Action dated Dec. 21, 2015", 15 pgs.

"U.S. Appl. No. 11/700,444, Non Final Office Action dated Apr. 9, 2015", 20 pgs.

(56) References Cited

OTHER PUBLICATIONS

"U.S. Appl. No. 11/700,444, Non Final Office Action dated May 26, 2016", 7 pgs.
"U.S. Appl. No. 11/700,444, Non Final Office Action dated Sep. 13, 2010", 13 pgs.
"U.S. Appl. No. 11/700,444, Non-Final Office Action dated Apr. 21, 2008", 3 pgs.
"U.S. Appl. No. 11/700,444, Non-Final Office Action dated Sep. 13, 2010", 13 pgs.
"U.S. Appl. No. 11/700,444, Non-Final Office Action dated Oct. 14, 2009", 12 pgs.
"U.S. Appl. No. 11/700,444, Notice of Non-Compliant Amendment dated Sep. 4, 2015", 3 pgs.
"U.S. Appl. No. 11/700,444, Pre-Appeal Brief Request filed Apr. 21, 2011", 5 pgs.
"U.S. Appl. No. 11/700,444, Response filed Jan. 13, 2011, to Non-Final Office Action dated Sep. 13, 2010", 14 pgs.
"U.S. Appl. No. 11/700,444, Response filed Jan. 14, 2010 to Non Final Office Action dated Oct. 14, 2009", 15 pgs.
"U.S. Appl. No. 11/700,444, Response filed Feb. 23, 2009 to Restriction Requirement dated Jan. 22, 2009", 6 pgs.
"U.S. Appl. No. 11/700,444, Response filed Mar. 21, 2016 to Final Office Action dated Dec. 21, 2015", 15 pgs.
"U.S. Appl. No. 11/700,444, Response filed Apr. 21, 2016 to Advisory Action dated Apr. 5, 2016", 22 pgs.
"U.S. Appl. No. 11/700,444, Response filed Jun. 29, 2010 to Final Office Action dated Apr. 29, 2010", 12 pgs.
"U.S. Appl. No. 11/700,444, Response filed Jul. 9, 2015 to Non Final Office Action dated Apr. 9, 2015", 21 pgs.
"U.S. Appl. No. 11/700,444, Response filed Jul. 13, 2009 to Final Office Action dated May 12, 2009", 8 pgs.
"U.S. Appl. No. 11/700,444, Response filed Aug. 11, 2009 to Final Office Action dated May 12, 2009", 9 pgs.
"U.S. Appl. No. 11/700,444, Response filed Aug. 12, 2009 to Advisory Action dated Aug. 11, 2009", 9 pgs.
"U.S. Appl. No. 11/700,444, Response filed Aug. 21, 2008 to Non-Final Office Action dated Apr. 21, 2008", 19 pgs.
"U.S. Appl. No. 11/700,444, Response filed Nov. 4, 2015 to Notice of Non-Compliant Amendment dated Sep. 4, 2015", 14 pgs.
"U.S. Appl. No. 11/700,444, Restriction Requirement dated Jan. 22, 2009", 7 pgs.
"U.S. Appl. No. 11/700,662 Final Office Action dated Aug. 6, 2010", 11 pgs.
"U.S. Appl. No. 11/700,662, Non-Final Office Action dated Mar. 17, 2010", 17 pgs.
"U.S. Appl. No. 11/700,662, Notice of Allowance dated Nov. 15, 2010", 6 pgs.
"U.S. Appl. No. 11/700,662, Response filed Jun. 17, 2010 to Non Final Office Action dated Mar. 17, 2010", 13 pgs.
"U.S. Appl. No. 11/700,662, Response filed Oct. 6, 2010 to Final Office Action dated Aug. 6, 2010", 12 pgs.
"U.S. Appl. No. 11/700,662, Response filed Oct. 29, 2009 to Restriction Requirement dated Sep. 30, 2009", 8 pgs.
"U.S. Appl. No. 11/700,662, Restriction Requirement dated Sep. 30, 2009", 6 pgs.
"U.S. Appl. No. 13/033,504, Non Final Office Action dated Mar. 14, 2014", 7 pgs.
"U.S. Appl. No. 13/033,504, Notice of Allowance dated Aug. 6, 2014", 5 pgs.
"U.S. Appl. No. 13/033,504, Response filed Jun. 13, 2014 to Non Final Office Action dated Mar. 14, 2014", 10 pgs.
"U.S. Appl. No. 13/033,504, Supplemental Notice of Allowability dated Oct. 9, 2014", 2 pgs.
"U.S. Appl. No. 13/536,951, Final Office Action dated Jun. 11, 2015", 16 pgs.
"U.S. Appl. No. 13/536,951, Final Office Action dated Jul. 29, 2013", 16 pgs.
"U.S. Appl. No. 13/536,951, Non Final Office Action dated Jan. 22, 2013", 11 pgs.
"U.S. Appl. No. 13/536,951, Non Final Office Action dated Mar. 18, 2016", 24 pgs.
"U.S. Appl. No. 13/536,951, Non Final Office Action dated May 16, 2014", 22 pgs.
"U.S. Appl. No. 13/536,951, Non Final Office Action dated Nov. 14, 2014", 13 pgs.
"U.S. Appl. No. 13/536,951, Response filed Apr. 14, 2015 to Non Final Office Action dated Nov. 14, 2014", 28 pgs.
"U.S. Appl. No. 13/536,951, Response filed Apr. 22, 2013 to Non Final Office Action dated Jan. 22, 2013", 12 pgs.
"U.S. Appl. No. 13/536,951, Response filed Aug. 18, 2014 to Non Final Office Action dated May 16, 2014", 16 pgs.
"U.S. Appl. No. 13/536,951, Response filed Oct. 1, 2012 to Restriction Requirement dated Aug. 30, 2012", 7 pgs.
"U.S. Appl. No. 13/536,951, Response filed Oct. 13, 2015 to Final Office Action dated Jun. 11, 2015", 15 pgs.
"U.S. Appl. No. 13/536,951, Response filed Nov. 27, 2013 to Final Office Action dated Jul. 29, 2013", 12 pgs.
"U.S. Appl. No. 13/536,951, Restriction Requirement dated Aug. 30, 2012", 5 pgs.
"U.S. Appl. No. 14/567,833, Final Office Action dated Nov. 16, 2015", 7 pgs.
"U.S. Appl. No. 14/567,333, Non Final Office Action dated Apr. 27, 2015", 11 pgs.
"U.S. Appl. No. 14/567,833, Notice of Allowance dated Mar. 4, 2016", 6 pgs.
"U.S. Appl. No. 14/567,833, Preliminary Amendment filed Mar. 16, 2015", 8 pgs.
"U.S. Appl. No. 14/567,833, Response filed Aug. 27, 2015 to Non Final Office Action dated Apr. 27, 2015", 12 pgs.
"U.S. Appl. No. 14/567,833, Response Filed Final Office Action dated Nov. 16, 2015", 8 pgs.
"U.S. Appl. No. 14/567,833, Examiner Interview Summary dated Jan. 14, 2016", 3 pgs.
"Chinese Application Serial No. 200880010522.2, Office Action dated Jul. 15, 2011", with English translation of claims, 10 pgs.
"eBay: Company Overview", [Online]. Retrieved from the Internet: <URL: http://web.archive.org/web/20040407121828/www.ebay.com/Homepage/company overview>, (2004), 2 pgs.
"International Application Serial No. PCT/US2008/001120, International Search Report dated Jan. 6, 2009", 3 pgs.
"International Application Serial No. PCT/US2008/001120, Written Opinion dated Oct. 9, 2008", 7 pgs.
"International Application Serial No. PCT/US2008/001135, International Search Report dated Oct. 9, 2008", 2 pgs.
"International Application Serial No. PCT/US2008/01135, Written Opinion dated Oct. 9, 2008", 6 pgs.
"Japanese Application Serial No. 2009-548276, Response filed May 22, 2012 to Office Action dated Feb. 28, 2012", with English translation of claims, 12 pgs.
"Japanese Application Serial No. 2009-548276, Examiners Decision of Final Refusal dated Oct. 9, 2012", with English Translation, 4 pgs.
"Japanese Application Serial No. 2009-548276, Office Action dated Feb. 28, 2012", with English translation of claims, 5 pgs.
"Japanese Application Serial No. 2013-024007, Office Action dated Feb. 25, 2014", with English translation of claims, 6 pgs.
"Japanese Application Serial No. 2013-024007, Response filed May 30, 2014", with English translation of claims, 11 pgs.
"Japanese Application Serial No. 2014-230304, Amendment filed Dec. 1, 2014", with English translation of claims, 10 pgs.
"Japanese Application Serial No. 2014-230304, Office Action dated Nov. 17, 2015", 4 pgs.
"Japanese Application Serial No. 2014-230304, Response filed Apr. 8, 2016 to Office Action dated Nov. 17, 2015", (English Translation of Claims), 11 pgs.
"Korean Application Serial No. 13/051,476, Final Office Action dated Oct. 23, 2013", with English translation of claims, 13 pgs.
"Korean Application Serial No. 2009-7018222—Office Action dated Apr. 4, 2012", with English translation of claims, 8 pgs.
"Korean Application Serial No. 2009-7018222, Office Action dated Apr. 19, 2011", with English translation of claims, 17 pgs.

(56) References Cited

OTHER PUBLICATIONS

"Korean Application Serial No. 2009-7018222, Office Action dated Nov. 23, 2011", with English translation of claims, 12 pgs.
"Korean Application Serial No. 2009-7018222, Response filed Feb. 28, 2012 to Office Action dated Nov. 23, 2011", with English translation of claims, 49 pgs.
"Korean Application Serial No. 2009-7018222, Response filed May 24, 2011 to Office Action dated Apr. 19, 2011", with English translation of claims, 48 pgs.
"Korean Application Serial No. 2009-7018222, Trial Board Decision dated Jul. 3, 2013", with English translation of claims, 14 pgs.
"Korean Application Serial No. 2012-7011728, Notice of Appeal filed Jan. 23, 2014", with English translation of claims, 21 pgs.
"Korean Application Serial No. 2012-7011728, Office Action dated Apr. 17, 2013", with English translation of claims, 8 pgs.
"Korean Application Serial No. 2012-7011728, Response filed Aug. 19, 2013", with English translation of claims, 23 pgs.
"What is a Joint Account?",", "wiseGEEK,, (2003-2005), 1 pg.
"www.eBay.com", [Online]. Retrieved from the Internet <URL: http://web.archive.org/web/20030801 073413/pages.ebay.com/index. html?ssPageName+h:H:home:US>, 2 pgs.
"U.S. Appl. No. 11/700,444, Final Office Action dated Oct. 6, 2016", 16 pgs.
"U.S. Appl. No. 11/700,444, Response filed Aug. 24, 2016 to Non Final Office Action dated May 26, 2016", 21 pgs.
"U.S. Appl. No. 13/536,951, Final Office Action dated Sep. 8, 2016", 19 pgs.
"U.S. Appl. No. 13/536,951 Response filed Jun. 20, 2016 to Non Final Office Action dated Mar. 18, 2016", 14 pgs.
"Japanese Application Serial No. 2014-230304, Notice of Allowance dated Sep. 13, 2016", with English translation, 7 pgs.

\* cited by examiner

METHOD AND SYSTEM FOR COLLABORATIVE AND PRIVATE SESSIONS

CLAIM OF PRIORITY

This application is a continuation of and claims the benefit of priority to U.S. patent application Ser. No. 14/567,833, filed on Dec. 11, 2014, which is a continuation of U.S. patent application Ser. No. 13/033,504, filed on Feb. 23, 2011, which is a continuation of U.S. application Ser. No. 11/700,662 filed Jan. 31, 2007, which applications are incorporated in their entirety herein by reference.

TECHNICAL FIELD

The present application relates generally to the field of data processing and, in one specific example, to a method and system for conducting collaborative and private shopping sessions.

BACKGROUND

Internet users tend to browse the world-wide web singularly for items of interest for possible purchase. These users may send e-mails to others regarding the items of interest and purchases made during these shopping sessions. On occasion, the users are provided with a coupon, discount, or other incentive to make a purchase during a shopping session.

BRIEF DESCRIPTION OF THE DRAWINGS

Some embodiments are illustrated by way of example and not limitation in the figures of the accompanying drawings in which.

DETAILED DESCRIPTION

Figure 1:
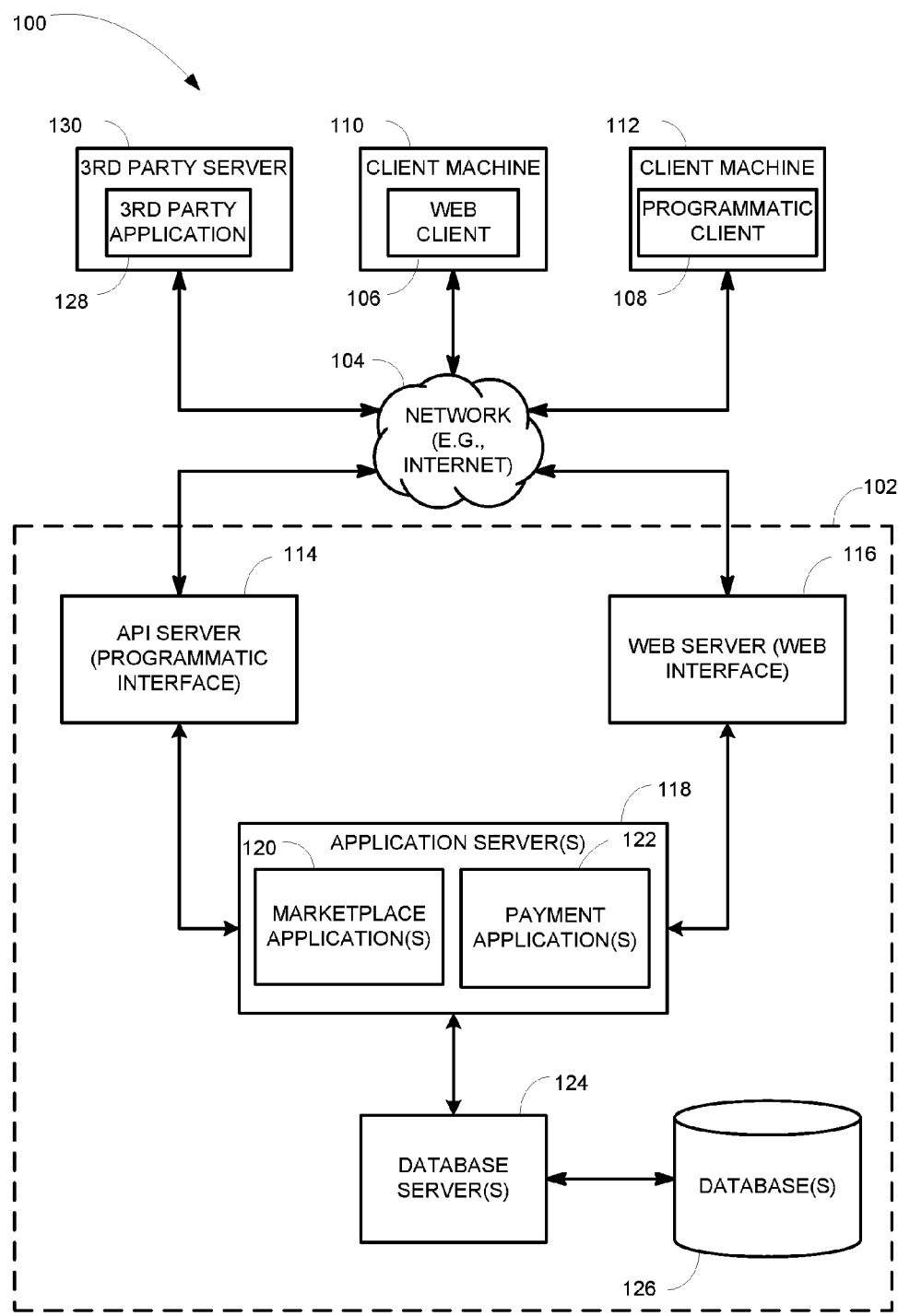
FIG. 1 is a network diagram depicting a network system, according to one embodiment, having a client server architecture configured for exchanging data over a network.

Example methods and systems for collaborative and private sessions are described. In the following description, for purposes of explanation, numerous specific details are set forth in order to provide a thorough understanding of example embodiments. It will be evident, however, to one skilled in the art that the present invention may be practiced without these specific details In an example embodiment, a plurality of users may be associated with a collaborative shopping session. The collaborative shopping session may include sharing of a common interface for shopping by the plurality of users. A cursor movement request may be received from at least two users of the plurality of users during a time period to move a cursor on the common interface during the collaborative shopping session. The cursor may be moved on the common interface according to the cursor movement request from a first user selected from the at least two users who has satisfied at least one movement criterion. An item may be selected on the common interface that is identified through movement of the cursor. An order request may be received for the item during the collaborative shopping session. The order request may be processed for the item.

In an example embodiment, a plurality of users may be associated with a collaborative session. The collaborative session may include sharing of a common interface for interaction between the plurality of users. A cursor movement request may be received from at least two users of the plurality of users during a time period. The cursor movement request may be to move a cursor of each of the at least two users on the common interface during the collaborative shopping session. The cursor of the at least two users may be distinguished on the common interface during the time period. The cursor may be moved by each of the at least two users on the common interface during the time period according to the cursor movement request.

In an example embodiment, a plurality of users may be associated with a collaborative shopping session. The collaborative shopping session including sharing of a common interface for shopping by the plurality of users. A primary account may be designated as being ultimately responsible for providing value in exchange for an item purchased with an order request during the collaborative shopping session. The primary account may be associated with at least one of the plurality of users. The order request may be received for the item. The order request may be processed for the item against the account.

In an example embodiment, a participant may be associated with a private shopping session. The private shopping session may include a session in which the participant has at least one of special access to an item or access to the item at a special price. A completion criterion may be designated for the private shopping session. A private session parameter may be designated for the private shopping session. A number of user interactions may be processed from the participant. The private shopping session may be terminated for the participant when the completion criterion is satisfied.

In an example embodiment, a primary participant may be selected for a collaborative shopping session. The collaborative shopping session may include sharing of a common interface for shopping by a plurality of users. A completion criteria may be designated for the collaborative shopping session. A secondary participant may be associated with the collaborative shopping session. A number of user interactions may be processed from at least one of the primary participant or the secondary participant. The secondary participant may be removed from the collaborative shopping session when completion criterion is satisfied.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or Wide Area Network (WAN)) to one or more clients. FIG. 1 illustrates, for example, a web client 106 (e.g., a browser, such as the Internet Explorer browser developed by Microsoft Corporation of Redmond, Wash. State), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

Figure 2:
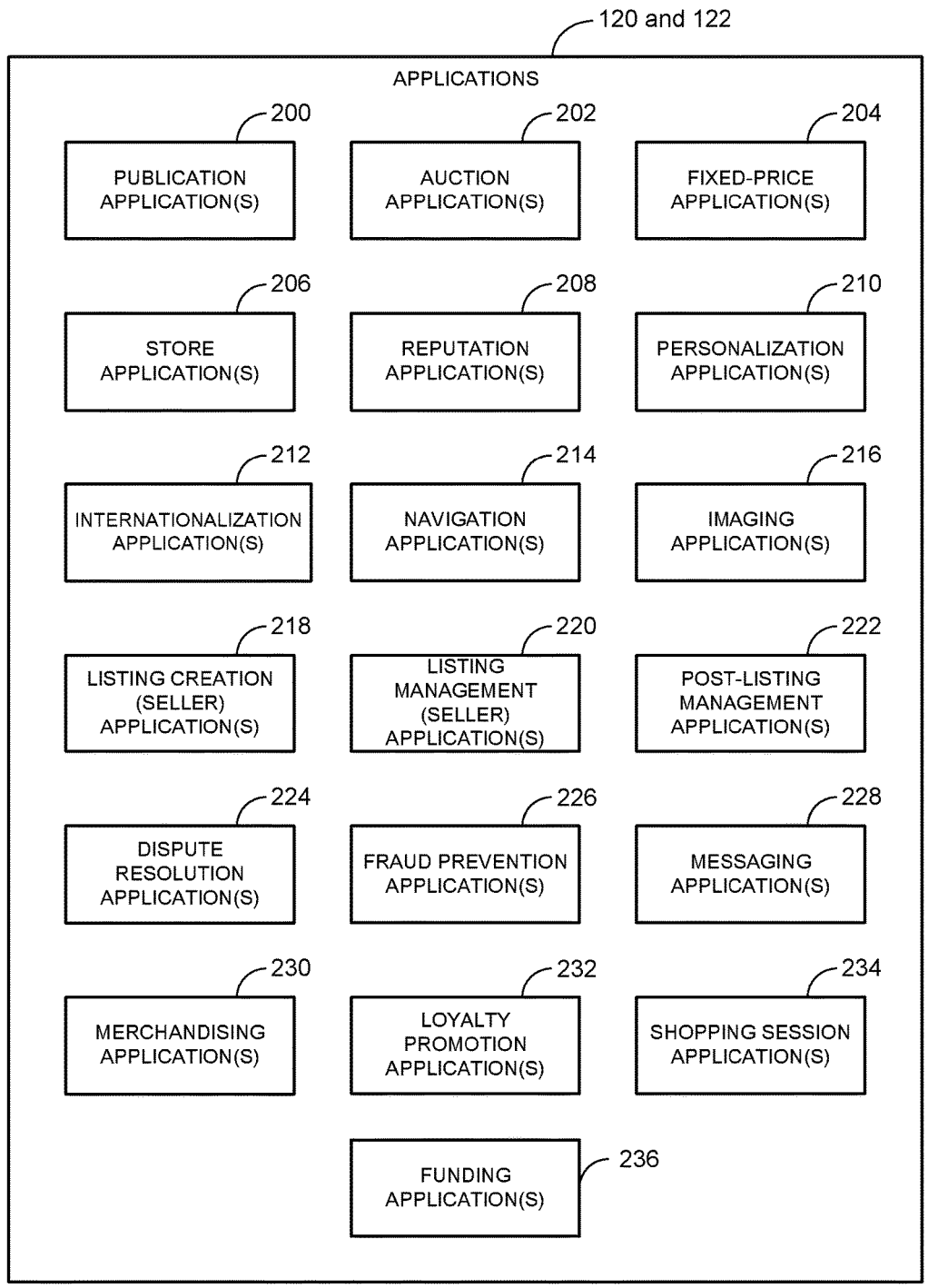
FIG. 2 is a block diagram illustrating an example embodiment of multiple network and marketplace applications, which are provided as part of the network-based marketplace.

FIG. 2 is a block diagram illustrating multiple applications 120 and 122 that, in one example embodiment, are provided as part of the networked system 102 (see FIG. 1). The applications 120 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 126 via the database servers 124.

The networked system 102 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 120 are shown to include at least one publication application 200 and one or more auction applications 202 which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives and features that are specific and personalized to a relevant seller.

Reputation applications 208 allow users that transact, utilizing the networked system 102, to establish, build and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user, for example through feedback provided by other transaction partners, to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace, or may be customized (or internationalized and/or localized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application) may enable key word searches of listings published via the networked system 102. A browse application may allow users to browse various category, catalogue, or system inventory structures according to which listings may be classified within the networked system 102. Various other navigation applications may be provided to supplement the search and browsing applications.

In order to make listings, available via the networked system 102, as visually informing and attractive as possible, the marketplace applications 120 may include one or more imaging applications 216 utilizing which users may upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers conveniently to author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102, such messages for example advising users regarding the status of listings at the networked system 102 (e.g., providing "outbid" notices to bidders during an auction process or to provide promotional and merchandising information to users). Respective messaging applications 228 may utilize any one have a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotions points for each transaction established and/or concluded with a particular seller, and be offered a reward for which accumulated loyalty points can be redeemed.

Shopping session applications 234 support various shopping sessions (e.g., private shopping sessions, collaborative shopping sessions, side shopping sessions, and individual browsing sessions) within the networked system 102. For example, a user may shop with other users during a collaborative shopping session or receive special offers for items during a private shopping session.

Funding applications 236 support funding of items that are bid-on and/or purchased. For example, the funding applications may receive value from a number of users to make a purchase of an item (e.g., during a shopping session).

Figure 3A:
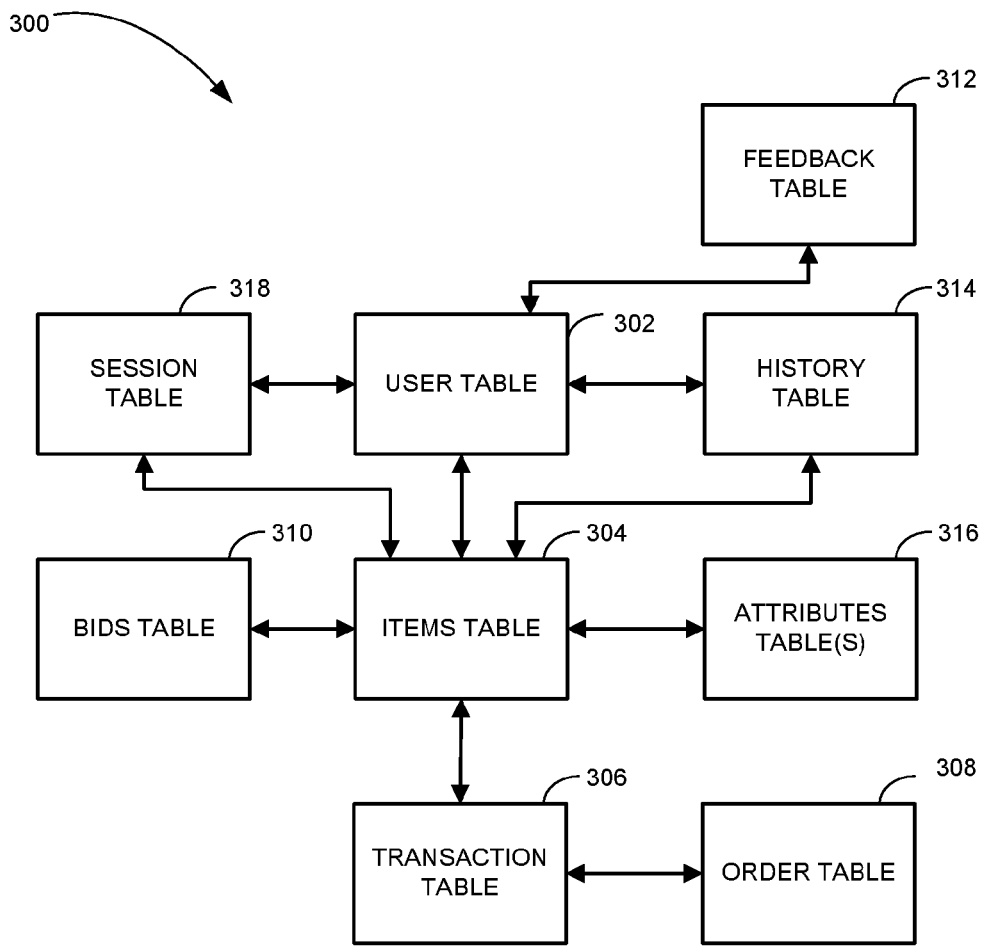
FIG. 3A is a high-level entity-relationship diagram, in accordance with one example embodiment, illustrating various tables that may be maintained within one or more databases.

FIG. 3A is a high-level entity-relationship diagram, illustrating various tables 300 that may be maintained within the databases 131, and that are utilized by and support the applications 120 and 122 (see FIG. 1). A user table 302 contains a record for each registered user of the networked system 102, and may include identifier, address and financial instrument information pertaining to each such registered user. A user may operate as a seller, a buyer, or both, within the networked system 102. In one example embodiment, a buyer may be a user that has accumulated value (e.g., commercial or proprietary currency), and is accordingly able to exchange the accumulated value for items (e.g., products and/or services) that are offered for sale by the networked system 102.

The tables 300 also include an items table 304 in which are maintained item records for goods and services that are available to be, or have been, transacted via the networked system 102. Each item record within the items table 304 may furthermore be linked to one or more user records within the user table 302, so as to associate a seller and one or more actual or potential buyers with each item record.

A transaction table 306 contains a record for each transaction (e.g., a purchase or sale transaction) pertaining to items for which records exist within the items table 304.

An order table 308 is populated with order records, each order record being associated with an order for a good and/or service. Each order, in turn, may be with respect to one or more transactions for which records exist within the transaction table 306.

Bid records within a bids table 310 each relate to a bid received at the networked system 102 in connection with an auction-format listing supported by an auction application 202. A feedback table 312 is utilized by one or more reputation applications 208, in one example embodiment, to construct and maintain reputation information concerning users.

A history table 314 maintains a history of transactions to which a user has been a party. The transactions may include those pertaining to items for which records exist within the items table 304 and for items with which no records exist within the items table 304 (e.g., for which payment services and functions of the payment application 122 were used without the marketplace application 120).

One or more attribute tables 316 record attribute information pertaining to items for which records exist within the items table 304. Considering only a single example of such an attribute, the attribute tables 316 may indicate a currency attribute associated with a particular item, the currency attribute identifying the currency of a price for the relevant item as specified in by a seller.

A session table 318 may include session records regarding session history (e.g., a history of shopping sessions). The session table may include a history of past areas (e.g., stores and/or sellers) visited during sessions within the networked system.

Figure 3B:
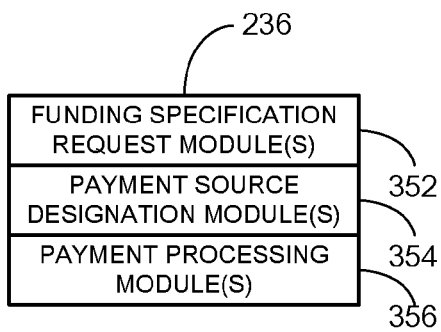
FIG. 3B is an example embodiment of a funding application.

Referring to FIG. 3B, an example funding application 236 (see FIG. 2) is illustrated. The funding application 236 may include one or more funding specification request modules 352, one or more payment source designation modules 354, and/or one or more payment processing modules 356.

The funding specification request module 352 (e.g., a first module) may be configured to receive a funding specification request. The funding specification request may specify a plurality of payment sources to be used to pay for a selection of value in the networked system 102 (see FIG. 1).

The payment source designation module 354 (e.g., a second module) may be configured to select from the funding specification request a payment allocation designating a first payment source of the plurality of sources. The payment allocation may be an allocation of a percentage of value to be provided by a plurality of users to pay the selection of value purchased through use of the networked system. The payment source designation module 354 may be configured to select from the funding specification request a designation of a user account from among the plurality of user accounts as a primary account. The primary account may be a second payment source of the plurality of sources. The primary account may be ultimately responsible for providing the value due for the selection of value.

The payment processing module 356 (e.g., a third module) may be configured to process a payment for the value due from the first payment source and process an additional payment from the second payment source when the payment does not satisfy the value due for the selection of the value.

Figure 4:
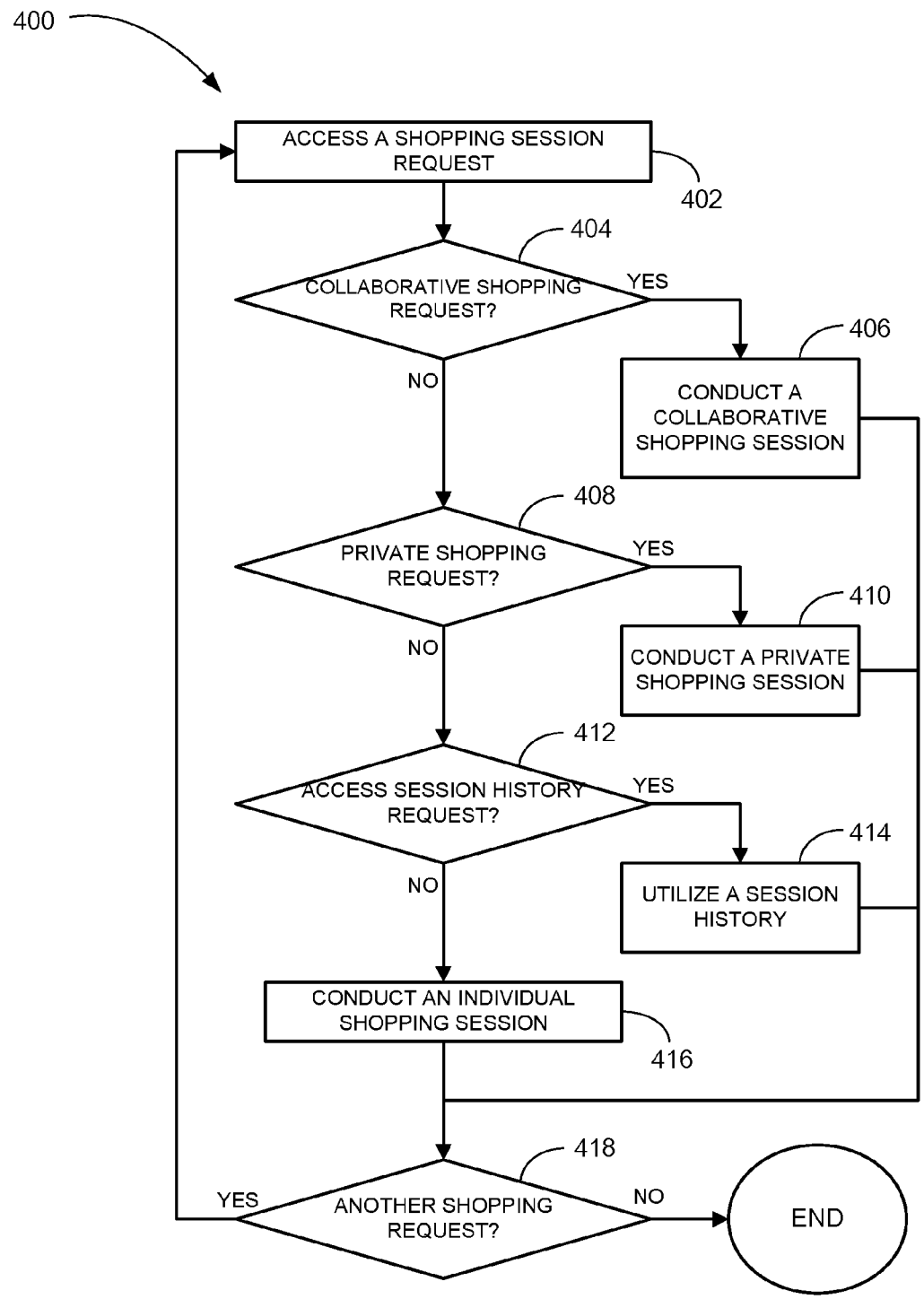
FIG. 4 is a flowchart illustrating a method for conducting a shopping session according to an example embodiment.

Referring to FIG. 4, a method 400 for conducting a shopping session is illustrated. In an example embodiment, the method 400 may be performed by the shopping session application 234 (see FIG. 2).

A shopping session request may be accessed at block 402. For example, the shopping session request may be received by the shopping session application 244 for a collaborative shopping session, a private shopping session, an individual shopping session, or a side shopping session.

A determination may be made at decision block 404 as to whether a collaborative shopping request has been received. If a collaborative shopping session request has been received, a collaborative shopping session may be conducted at block 406. For example, the collaborative shopping session may include sharing of a common interface for shopping by the plurality of users (e.g., as may be displayed on a computer system of each user). An example embodiment of conducting a collaborative session is described in greater detail below. If a collaborative shopping session request has not been received at decision block 404, the method 400 may proceed to decision block 408.

At decision block 408, a determination may be made as to whether a private shopping request has been received. If a private shopping session request has been received, a private shopping session may be conducted at block 410. For example, the private shopping session may include a shopping session in which one or more participants each have special access to one or more items and/or access to one or more items at a special price (e.g., at a discount or free). An example embodiment of conducting a private session is described in greater detail below. If a private shopping session request has not been received at decision block 408, the method 400 may proceed to decision block 412.

A determination may be made at decision block 412 as to whether a request to access session history has been received. If a request to access session history has been received, the session history may be accessed at block 414. For example, a user may access a history of a private shopping session, a collaborative shopping session, a side shopping session, and/or an individual shopping session from the session table 318 (see FIG. 3A). In an example embodiment, in response to receiving a request for a session record of a session (e.g., the collaborative shopping session), a location of a past area visited within the networked system 102 during the session as contained in a session record of the session table 318 may be provided through a common interface and/or an individual interface (e.g., an interface not shared with another user at a same time during a session).

If a request to access the session history has not been received at decision block 412, an individual shopping session may be conducted at block 416. For example, the individual shopping session may include a user participating in a shopping session using the individual interface. Upon completion of the operations at block 406, block 410, block 414, or block 416 the method 400 may proceed to decision block 418.

A determination may be made at decision block 418 as to whether another shopping request will be made. If another shopping request will be made, the method 400 may return to block 402. If another shopping request will not be made at decision block 418, the method 400 may terminate.

Figure 5:
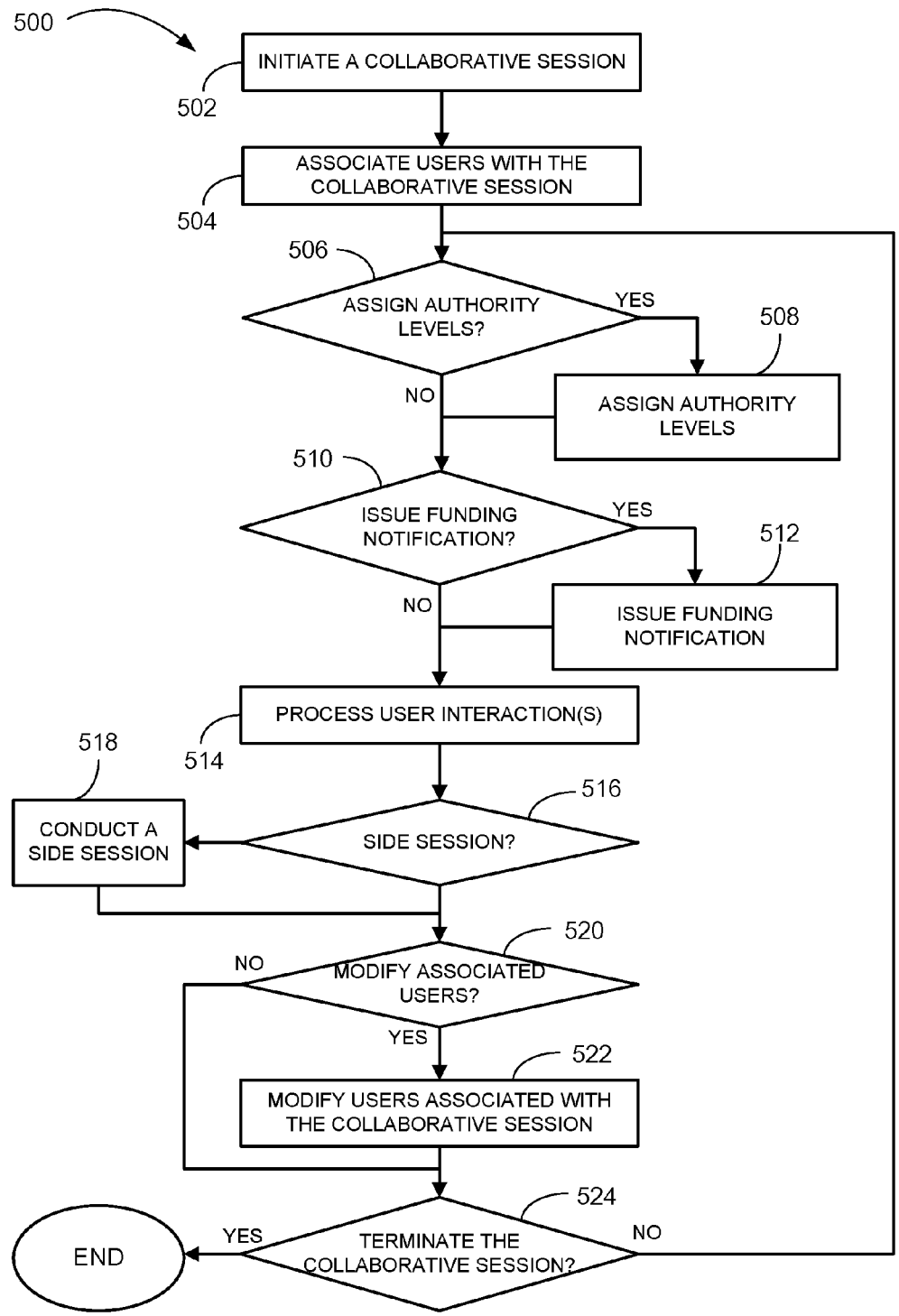
FIG. 5 is a flowchart illustrating a method for conducting a collaborative session according to an example embodiment.

Referring to FIG. 5, a method 500 for conducting a collaborative session (e.g., a collaborative shopping session) according to an example embodiment is illustrated. In an example embodiment, the method 500 may be performed at block 406 (see FIG. 4) and/or by the shopping session application 234 (see FIG. 2).

A collaborative session (e.g., a collaborative shopping session) may be initiated at block 502. For example, the collaborative session may be initiated by a first user of the networked system 102. In an example embodiment, initiating the collaborative session may include defining a merge criterion for a side session and/or a completion criterion for the collaborative session. The use of the merge criterion for the side session and the completion criterion is described in greater detail below.

A plurality of users (e.g., two or more users) may be associated with the collaborative session at block 504. For example, a first user may select one or more other users to participate with the first user in the collaborative session and the selections may be provided to the shopping session application 234 for association. The others user may be indicated as being available (e.g., by use of a different icon, changing colors of an icon, and the like) for the collaborative session to the first user by the networked system 102 (see FIG. 1). A number of users may join a collaborative session (e.g., at a set start time or in an ongoing manner) using a special password. The users may be imported from a user list (e.g., from Skype by Skype Limited) or a contact list (e.g., from Microsoft Outlook by Microsoft Corporation) of another application. Other associations of users with the collaborative session at the initiation of the collaborative session or during the conducting of the collaborative session may also be used.

A determination may be made at decision block 506 as to whether authority levels may be assigned to the plurality of users of the collaborative session. If a determination is made to assign the authority levels, the authority levels may be assigned to the plurality of users associated with the collaborative session at block 508. The authority levels may indicate whether any of the users of the collaborative session having a greater and/or varying level of authority to perform some session interactions when another user is also seeks to perform session interactions. The use of the authority levels during a collaborative session is described in greater detail below. If a determination is made not to assign authority levels at decision block 506 or upon completion of the operations at block 508, the method 500 may proceed to decision block 510.

In an example embodiment, a threshold authority level may be assigned to the collaborative session for making an execution request at block 508. For example, users participating in the collaborative session that do not meet the threshold authority level of the collaborative session may not be able to make executions but may otherwise participate in the collaborative session. The use of authority levels with execution requests is described in greater detail below.

In an example embodiment, the users of the collaborative session may be provided with a default authority level. For example, the user that requested the collaborative session may have a higher authority level than the remaining users of the collaborative session. Other default authority levels may also be used.

A determination may be made at decision block 510 whether to issue a funding notification. For example, the funding notification may provide notice that value may be associated with the collaborative shopping session from at least one user of the collaborative session (e.g., a request for value from one or more users), value has been associated with the collaborative session (e.g., sufficient value to start the collaborative session) through a user account (e.g., a primary account) and/or a joint fund (e.g., value pooled from a number of users of a session), and the like. If a determination is made to issue the funding notification, the funding notification may be issued (e.g., to the plurality of users of the collaborative session) at block 512. If a determination is made at decision block 510 not to issue the funding notification or upon completion of the operations at block 512, the method 500 may proceed to block 514.

One or more users interactions may be processed from among users (e.g., participants) associated with the collaborative session at block 514. An example embodiment of processing the user interactions is described in greater detail below.

A determination may be made at decision block 516 whether to conduct a side session. If a determination is made to conduct a side session at decision block 516, the side session may be conducted at block 518. A user participating in a side browsing session may continue to be part of the collaborative session or may temporarily disengage from the collaborative session while engaged in the side session. For example, the collaborative session may continue to operate for the plurality of users during operation of the side session for the user participating in the side browsing session. An example embodiment of conducting a side session is described in greater detail below.

If a determination is made not to conduct the side browsing session at decision block 516 or upon completion (and/or initiation) of the operations at block 518, the method 500 may proceed to decision block 520.

At decision block 520, a determination may be made whether to modify the users associated with the collaborative session. For example, a user (e.g., a participant) may be added to or removed from the collaborative session. If a determination is made to modify the users associated with the collaborative session, the users associated with this session may be modified at block 522. If a determination is not to modify the associated users with the collaborative session at decision block 520 or upon completion of the operations at block 522, the method 500 may proceed to decision block 524.

At decision block 524, a determination may be made whether to terminate the collaborative session. For example, the collaborative session may be terminated when a completion criterion is met (e.g., when the plurality of users or a user with the highest authority levels the collaborative session). If a determination is made not to terminate the collaborative session, the method 500 may return to decision block 506. If a determination is made to terminate the collaborative session, the method 500 may terminate.

Figure 6:
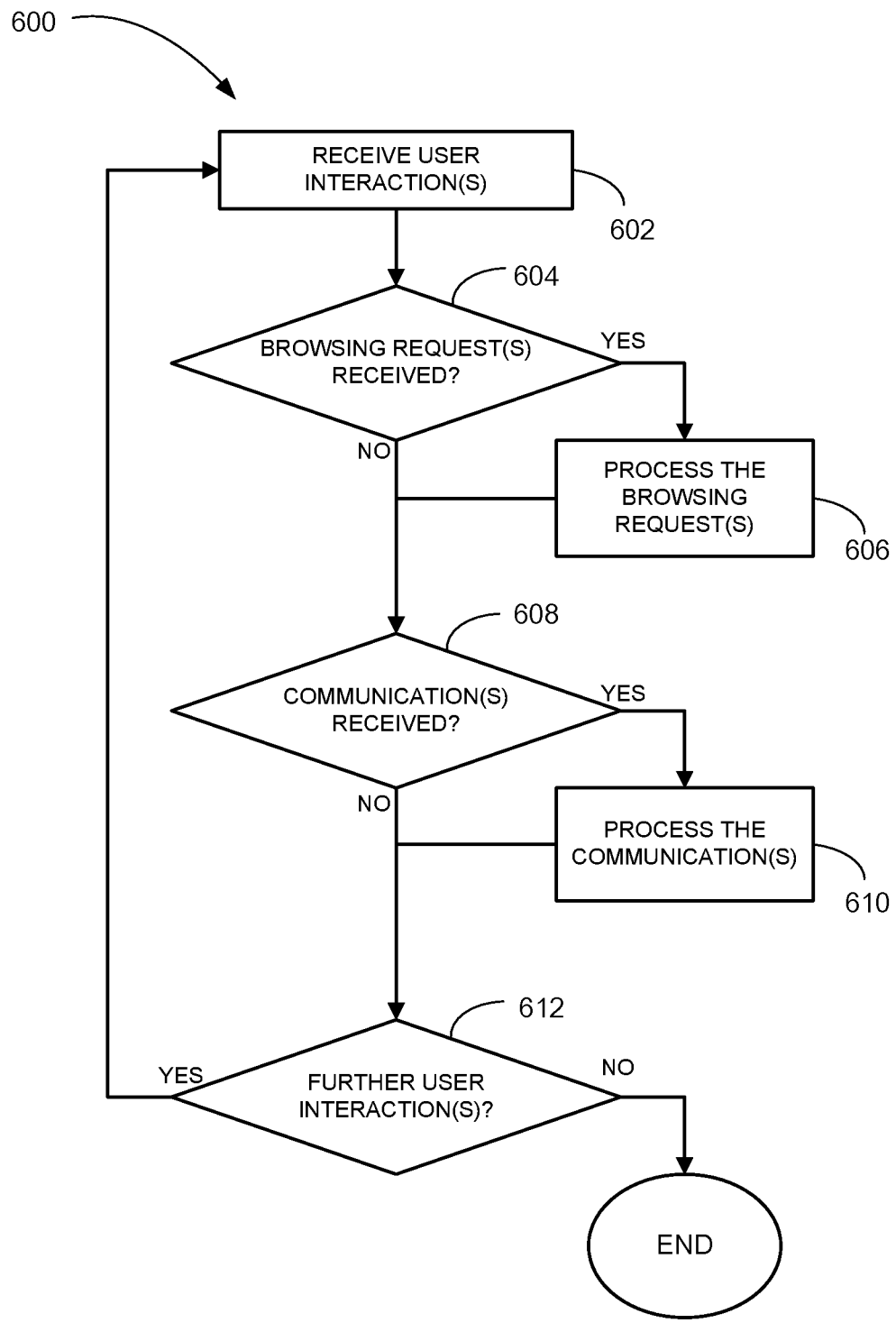
FIG. 6 is a flowchart illustrating a method for processing a user interaction according to an example embodiment.

Referring to FIG. 6, a method 600 for processing a user interaction according to an example embodiment is illustrated. In an example embodiment, the method 600 may be performed at block 514 (see FIG. 5).

One or more user interactions may be received (e.g., during a time period) at block 602. For example, the user interaction may be a communication provided by a user to the shopping session application 234 (see FIG. 2).

At decision block 604, a determination may be made as to whether one or more browsing requests have been received. If a browsing request has been received, the browsing request may be processed (e.g., to obtain content) at block 606. An example embodiment of processing a browsing request is described in greater detail below. If a browsing request has not been received at decision block 604 or after completion of the operations at block 606, the method 600 may proceed to decision block 608.

A determination may be made at decision block 608 as to whether one or more communications (e.g., from the plurality of users) have been received. If a communication has been received from a source user among the plurality of users, the communication may be delivered to one or more targets users among the plurality of users at block 610. For example, the communication may be delivered by instant message (e.g., by AOL Instant Messenger from AOL, LLC), voice communication (e.g., by SKYPE from Skype Limited), text messaging, and the like. If a communication has not received at decision block 608 or after completion of the operations at block 610, the method 600 may proceed to decision block 612.

At decision block 612, a determination may be made as to whether there is a further user interaction. If there is a further user interaction, the method 600 may return to block 602. If there is no further user interaction at decision block 618, the method 600 may terminate.

Figure 7:
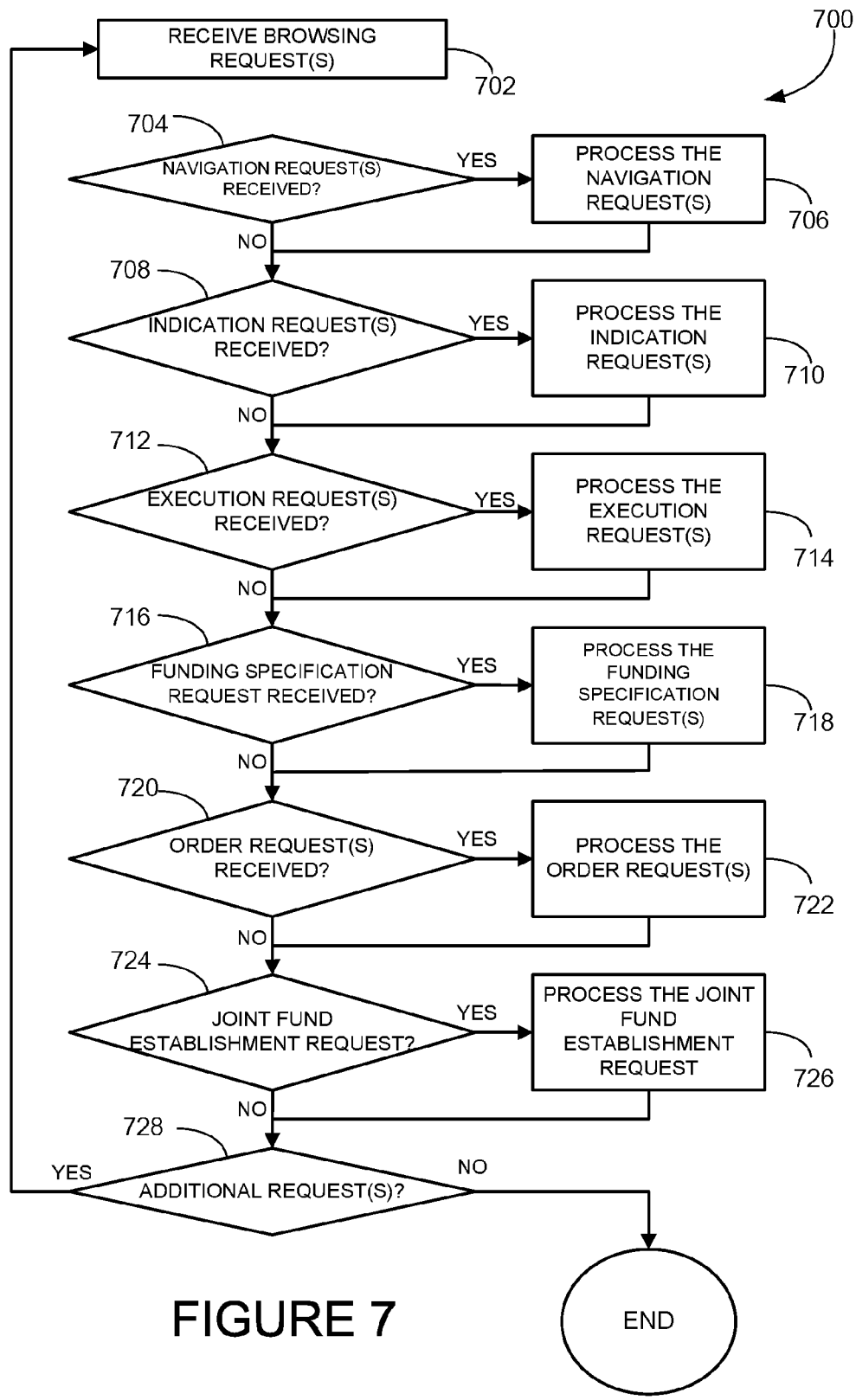
FIG. 7 is a flowchart illustrating a method for processing a browsing request according to an example embodiment.

Referring to FIG. 7, the method for processing a browsing request according to an example embodiment is illustrated. In an example embodiment, the operations of the method 700 may be performed at block 606 (see FIG. 6).

One or more browsing requests may be received from one or more users (e.g., participants) of a collaborative session at block 702. For example, the browsing requests may include a cursor movement request, an indication request, an execution request, an account specification request, an order request, and the like.

A determination may be made at decision block 704 whether one or more navigation requests (e.g., a request by a participant to navigate on a common interface of the collaborative session) have been received. If a navigation request has been received, the navigation request may be processed at block 706. An example embodiment of processing the navigation request is described in greater detail below. If the cursor movement request has not been received at decision block 704 or after completing the operations at block 706, the method may proceed to decision block 708.

At decision block 708, a determination may be made as to whether one or more indication requests (e.g., a request by a participant to make an indication on a screen of a collaborative session) have been received. If an indication request has been received (e.g., from a first user making the cursor movement or a second user), the indication request may be processed at block 710 to make the indication on the common interface. For example, an indication requested by the indication request may be a marking (e.g., a circle or square), a notation (e.g., text or pictures), a selection (e.g., of one or more options from a number of available options), or the like on the common interface of the collaborative session. The indication may be for display only on the screen or may be processed (e.g., by the shopping session application 234) during an execution request. A method of processing the indication request is described in greater detail below. If an indication request has not been received at decision block 708 or after completion of the operations at block 710, the method 700 may proceed to decision block 712.

In an example embodiment, if each of the participants of the session have their own cursor to control, each participant may be able to provide indications (e.g., markings or notations) during the collaborative session. When each of the participants of the session share a cursor, each of the participants may be limited to providing indications (or a certain type of indications such as markings) only when the participant has shared cursor control (e.g., control of a shared cursor) during the collaborative session.

A determination may be made at decision block 712 as to whether one or more execution requests have been received (e.g., whether the browser request is an execution request). If an execution request (e.g., a request by a participant to process indications) has been received, the execution request may be processed at block 714. An example embodiment of processing the execution request is described in greater detail below. If the execution request has not been received at decision block 712 or upon completion of the operations at block 714, the method 700 may proceed to decision block 716.

At decision block 716, a determination may be made as to whether one or more funding specification requests have been received (e.g., whether the browser request is a funding specification request). If a funding specification request has been received, the funding specification request may be processed at block 718. An example embodiment of processing the funding specification request is described in greater detail below. If a funding specification request has not been received at decision block 716 or upon completion of the operations at block 718, the method 700 may proceed to decision block 720.

A determination may be made at decision block 720 as to whether one or more order requests have been received (e.g., whether the browser request is an order request). If an order request has been received, the order request (e.g., a request by a participant to order one or more items during a collaborative shopping session) may be processed at block 722. If an order request has not been received at decision block 720 or upon completion of the operations at block 722, the method 700 may proceed to decision block 724.

A determination may be made at decision block 724 whether a joint fund establishment request has been received (e.g., whether the browser request is a joint fund establishment request). If a joint fund establishment request has been received, the joint fund establishment request may be processed at block 726. An example embodiment of processing the joint fund establishment request is described in greater detail below. If a joint fund establishment request has not been received at decision block 724 or upon completion of the operations at block 726, the method 700 may proceed to decision block 728.

At decision block 728, a determination may be made as to whether one or more additional browser requests have been received. If another browser request has been received, the method 700 may return to block 702. If another browser request has not been received at decision block 724, the method 700 may terminate.

Figure 8:
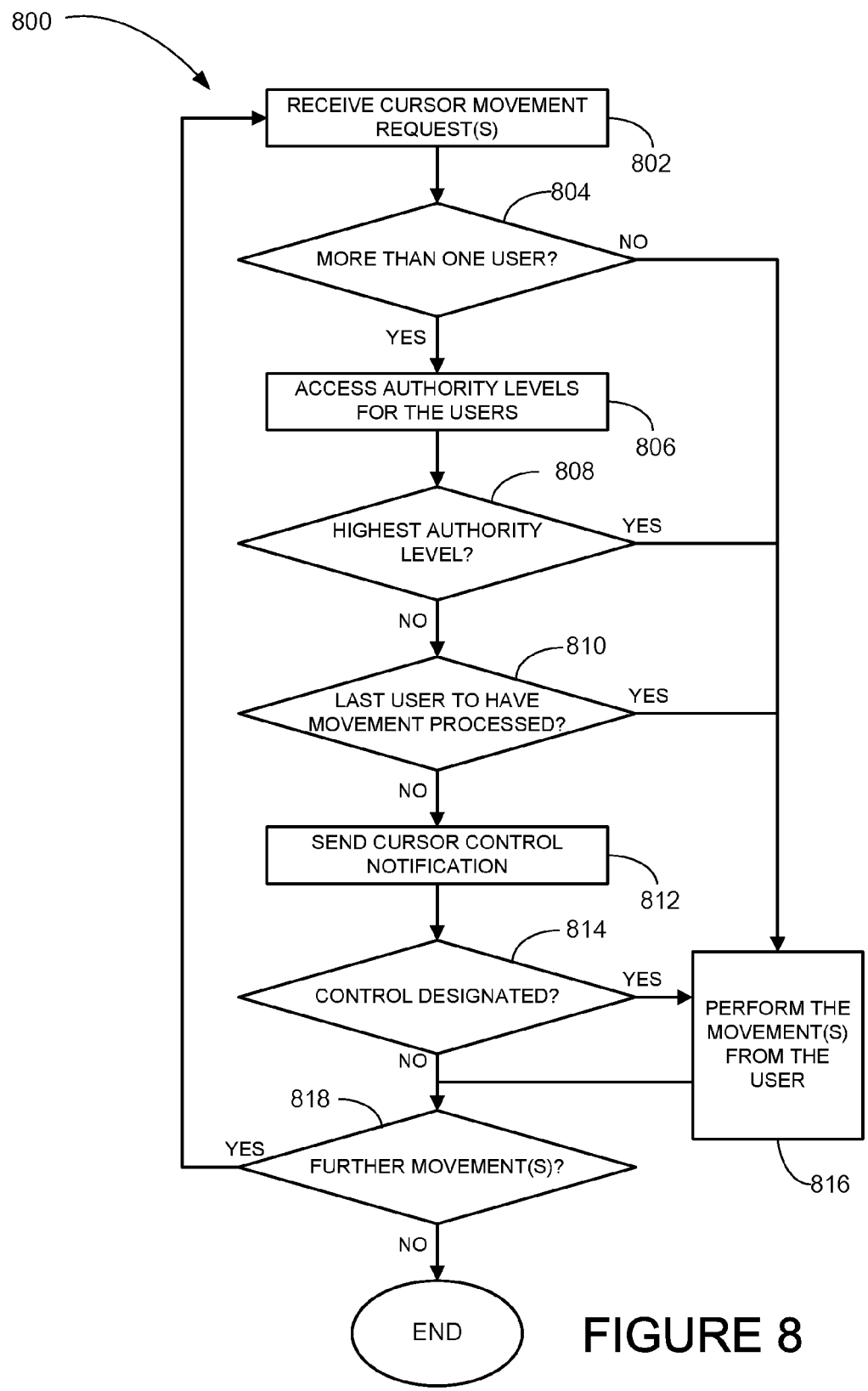
FIG. 8 is a flowchart illustrating a method for processing a navigation request according to an example embodiment.

Referring to FIG. 8, a method 800 for processing a navigation request according to an example embodiment is illustrated. In an example embodiment, the method 800 may be performed at block 706 (see FIG. 7). For example, the method 800 may be performed when the collaborative session uses a single cursor that is subject to movement by all participants of the collaborative session.

One or more cursor movement requests may be received during a time period from among a plurality of users at block 802. The time period may accommodate a single cursor movement from a user (e.g., a second or a portion of a second in duration) or may be of a sufficient amount (e.g., a variable or fixed amount) to accommodate multiple cursor movements from a single user.

A determination may be made at decision block 804 as to whether cursor movement requests have been received from more than one user. If cursor movement requests have not been received from more than one user during the time period, the movements requested by the movement request of the user may be performed at block 816.

If a determination is made that the cursor movement requests have been received from more than one user (e.g., at least two users of the plurality of users) during the time period at decision block 804, the authority levels for the at least two users making the movement requests may be accessed at block 806. In an example embodiment, the authority levels for the at least two users may be assigned during the operations at block 508 (see FIG. 5) and/or accessed for all users of the collaborative session at block 806.

At decision block 808, a determination may be made as to whether any of the at least two users of the collaborative session making the movement request has a highest authority level. If a user making a movement request has a highest authority level, one or more cursor movements (e.g., from the movement request) from the user with the highest authority level may be performed (e.g., by moving the cursor) at block 816. If a user does not have a highest authority level, the method 800 may proceed to decision block 810.

A determination may be made at decision block 810 as to any of the at least two users of the collaborative session making the movement request is a last user to have movement processed during the collaborative session. If a user among at least two users of the collaborative session making a movement request is a last user to have movement processed, the one or more cursor movements of the last user may be performed at block 816.

If one of the at least two users of the collaborative session making the movement request is not a last user to have a movement processed at decision block 810, cursor control notification may be sent to the at least two users at block 812. For example, cursor control notification may be a request sent to the at least two users making movement requests to enable a selection of a user for movement processing. For example, a second user making a movement request may designate a first user making a movement request to make one or more movements during the time period.

A determination may be made at decision block 814 as to whether control has been designated to a user. If control has been designated, the movements from the designated user (e.g., the first user) may be performed at block 816. In an example embodiment, the cursor may be moved during the operations of block 816 according to the cursor movement request from a user that has satisfied a highest authority level (e.g., from decision block 808), a last user to have a cursor movement processed (e.g., from decision block 810), and/or control designated from another user (e.g., from the decision block 814).

In an example embodiment, the movement criterion determined during operations at decision block 808, decision block 810, and decision block 814 and may occur in any order.

If control has not been designated at decision block 814 or upon completion of the operations at block 816, then method 800 may make a determination at decision block 818 as to whether further movement requests are to be received. If one or more further movement requests are to be received, the method 800 may return to block 802. If one or more further movement requests are not to be received, the method 800 may terminate.

It should be appreciated that other navigation devices beyond a cursor may be used with the method 800, and that the navigation requests may result in navigation movement on the common interface.

Figure 9:
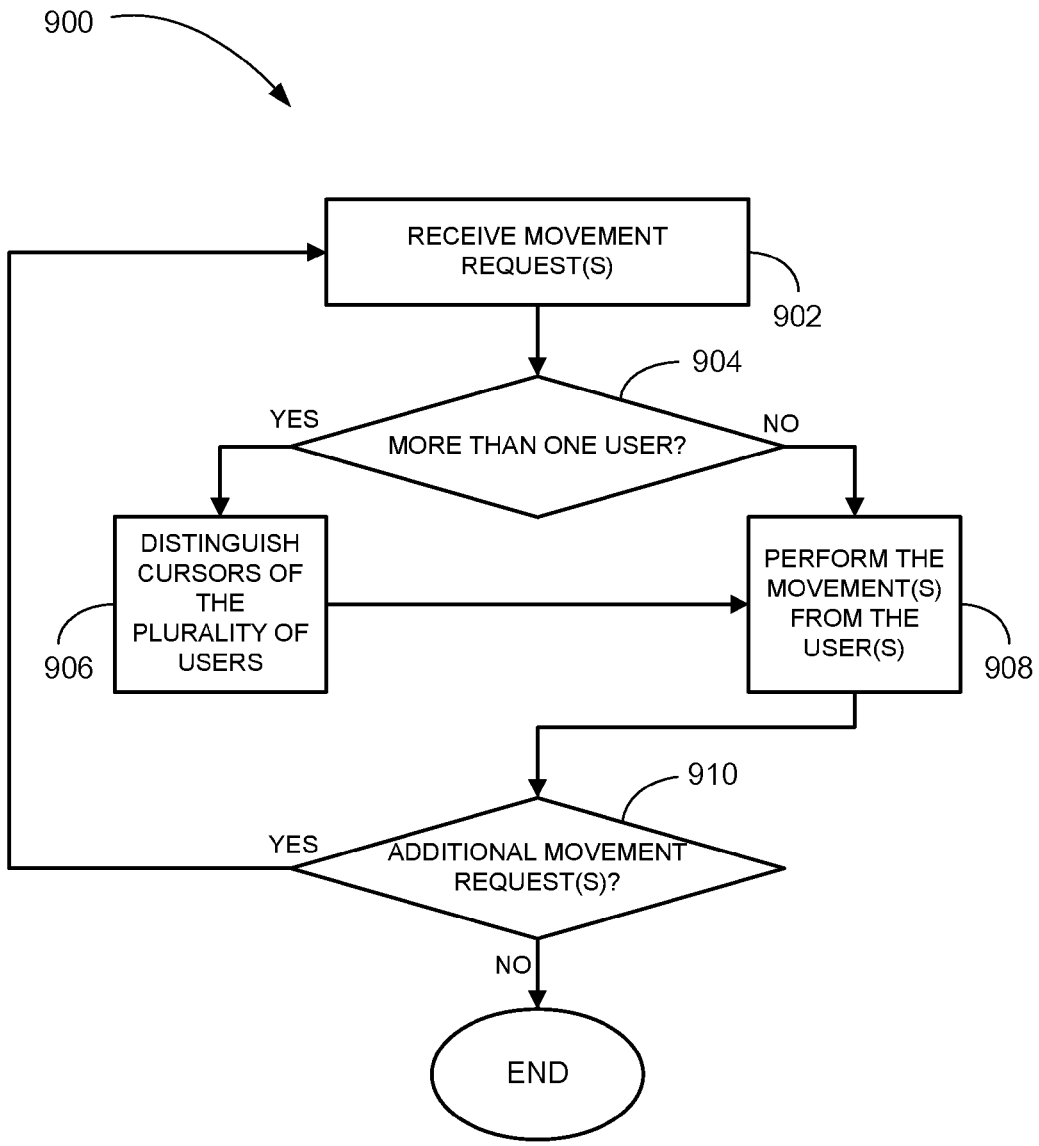
FIG. 9 is a flowchart illustrating a method for processing a navigation request according to an example embodiment.

Referring to FIG. 9, a method for processing a navigation request according to an example embodiment is illustrated. In an example embodiment, the method 900 may be performed at block 706 (see FIG. 7). For example, the method 900 may be performed when the collaborative session enables each of the plurality of users of the collaborative session to use a separate cursor on a common interface.

One or more cursor movement requests may be received during a time period from among a plurality of users at block 902. The time period may accommodate a single cursor movement from a user (e.g., a second or a portion of a second in duration) or may be of a sufficient amount (e.g., a variable or fixed amount) to accommodate multiple cursor movements from a single user.

A determination may be made at decision block 904 as to whether a movement request has been received from more than one user (e.g., at least two users of the plurality of users). If a movement request has been received from more than one user, the cursors of the at least two users making the movement requests may be changed to a distinguished cursor on the common interface during the time period at block 906. For example, the cursors of the at least two users making a cursor request during a time period may each have a cursor that is a different color cursor, a different size cursor, an icon (e.g., an avatar), and the like from another cursor.

If movements have not been received from more than one user at decision block 904 or upon completion of the operations at block 906, the movements may be performed at block 908.

At decision block 910, a determination may be made as to whether further movements are to be accessed. If further movements are to be accessed, the method 900 may return to block 902. If further movements are not to be accessed at decision block 910, the method 900 may terminate.

It should be appreciated that other navigation devices beyond a cursor may be used with the method 900, and that the navigation requests may result in navigation movement on the common interface.

Figure 10:
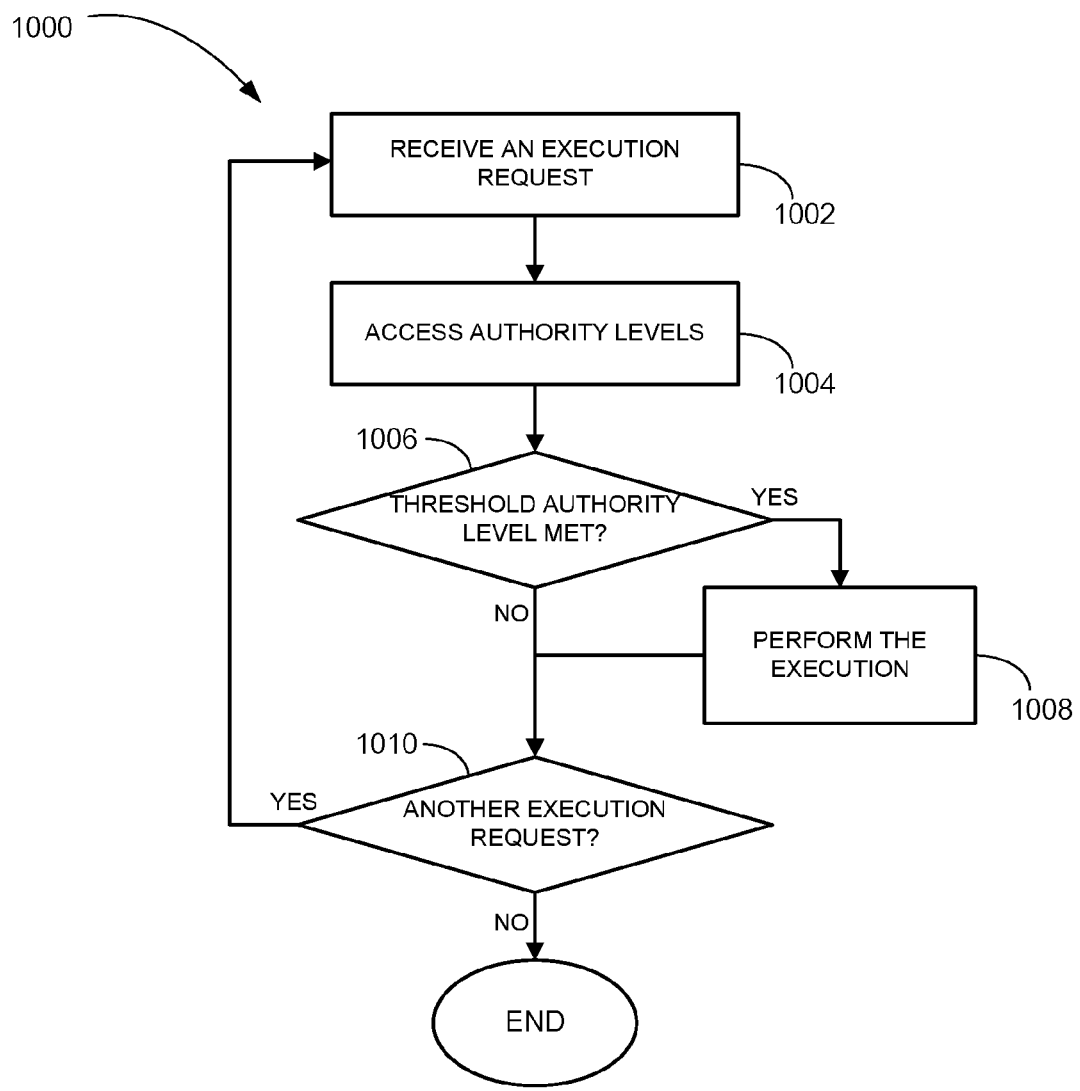
FIG. 10 is a flowchart illustrating a method for processing an execution request according to an example embodiment.

Referring to FIG. 10, a method 1000 for processing an execution request according to an example embodiment is illustrated. In an example embodiment, the method 1000 may be performed at block 714 (see FIG. 7).

An execution request from a user of a collaborative session may be received at block 1002. For example, the execution request may be a request to process an indication made on the common interface of the collaborative session.

The authority level of the user and the threshold authority level for performing execution requests during the collaborative session may be accessed at block 1004. For example, the authority levels may be defined during the operations at block 508 (see FIG. 5).

A determination may be made at decision block 1006 as to whether the user has met the threshold authority level (e.g., to perform an execution request during the collaborative session). If the threshold authority level has been met, an execution requested by the execution request may be performed at block 1008. For example, the execution may be an order request, a request for an additional screen, a request for additional information regarding an item, and the like. If the threshold authority level has not been met at decision block 1006 or after completing the operations at block 1008, the method 1000 may proceed to decision block 1010.

At decision block 1010, a determination may be made as to whether another execution request has been received. If another execution request has been received, then method 1000 may return to block 1002. If another execution request has not been received at decision block 1010, the method 1000 may terminate.

Figure 11:
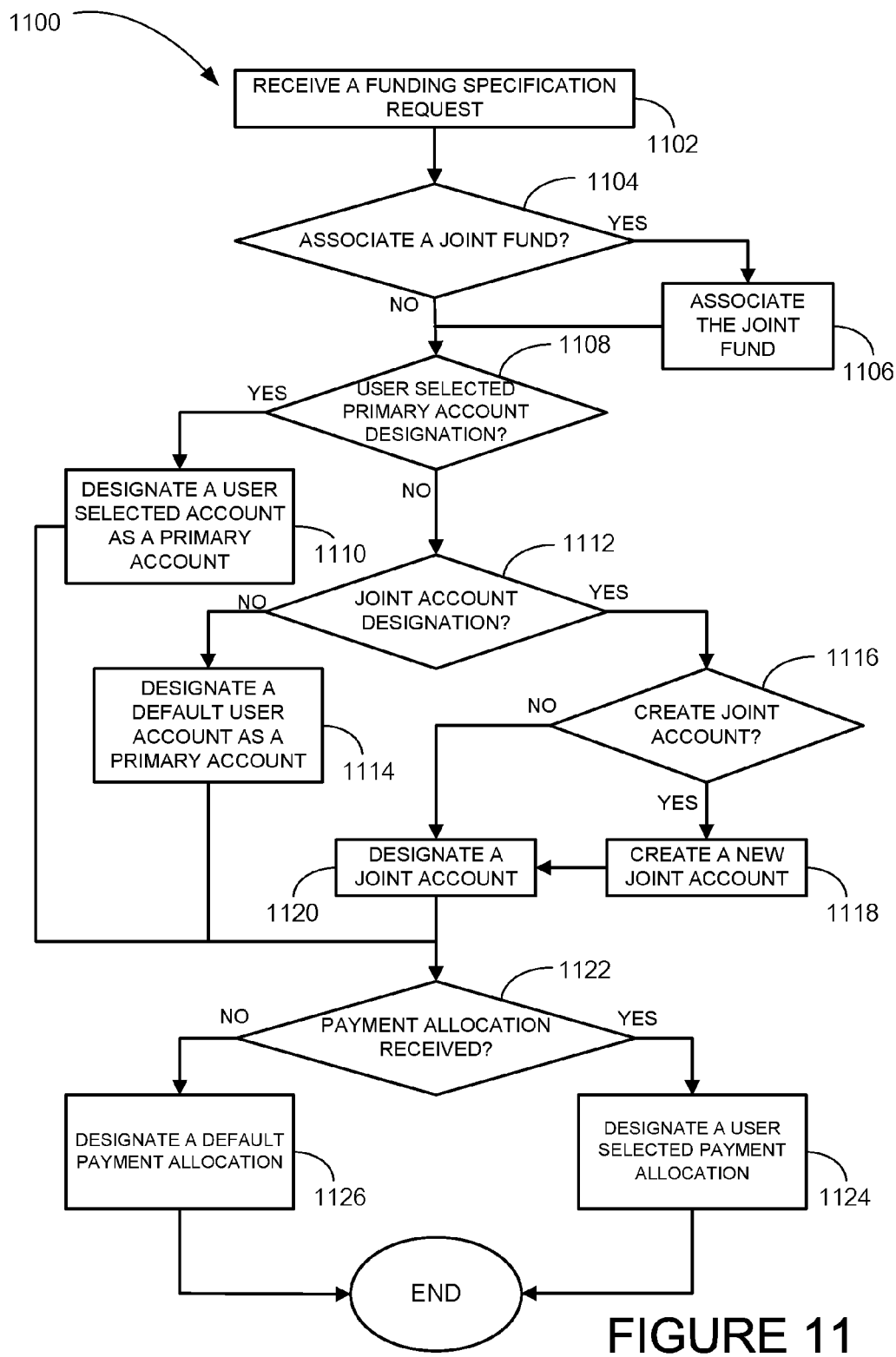
FIG. 11 is a flowchart illustrating a method for processing a funding specification request according to an example embodiment.

Referring to FIG. 11, a method 1100 for processing a funding specification request according to an embodiment is illustrated. In an example embodiment, the method 1100 may be performed at block 718 (see FIG. 7).

A funding specification request may be received at block 1102. The funding specification request may define a plurality of payment sources to be used to pay for a selection of value (e.g., an item) in a networked system. The funding specification request may specify at least one payment source including a joint fund, a primary account for payment, and/or a payment allocation.

A determination may be made at decision block 1104 as to whether a joint fund may be associated (e.g., with the collaborative session). The joint fund is value provided by a plurality of users to be applied to a payment due for an item purchased (e.g., during one or more collaborative shopping sessions). For example, the joint fund may include user provided value to be applied during payment processing before other payment sources. The joint fund may optionally be associated with the joint account. If a determination is made to associate a joint fund, the joint fund may be associated at block 1106. For example, an existing joint fund may be accessed or a new joint fund may be established. An example embodiment of establish the joint fund is described in greater detail below. If a determination is made not to associate a joint fund at decision block 1104 or upon completion of the operations at block 1106, the method 1100 may proceed to decision block 1108.

A determination may be made at decision block 1108 as to whether a user selected primary account designation has been made. For example, designation of a user account as a primary account may provide the one or more users of the user account with ultimate responsibility for providing value due for a selection of value (e.g., one or more items purchased at a fixed rate or bid on through the collaborative shopping session). If a user selected primary account specification has been made, a selected user account (e.g., from the users of the collaborative session) may be designated as the primary account (e.g., ultimately responsible for providing value due) at block 1110.

If a determination is made at decision block 1108 that the user selected primary account designation has not been made, the method 1100 may proceed to decision block 1112 to determine whether a joint account specification has been made. If a joint account designation has not to been made, a default user account may be designated as a primary account at block 1114. For example, a default user may be a user that has been registered with the networked system 102 (see FIG. 1) for the longest period of time, has the greatest amount of accumulated value, or the like. If the joint account designation has been made at decision block 1112, the method 1100 may proceed to decision block 1116.

At decision block 1116, a determination may be made as to whether a joint account may be created. For example, the joint account may be associated with more than one user of the plurality of users and ultimately responsible for providing value in exchange for one or more items purchased through the collaborative session. If a joint account is to be created, a new joint account may be created (e.g., and associated with a plurality of users of the collaborative session) at block 1118 and the joint account may be designated at block 1120. If the joint account is not to be created at decision block 1116, an existing joint account may be designated at block 1120. It should be appreciated that a joint account may be used for one or more sessions.

Upon completion of the operations at block 1110, block 1114, or block 1120, the method 1100 may proceed to decision block 1122. A determination may be made at decision block 1122 as to whether payment allocation (e.g., an allocation of an amount of value to be provided by designated users for an item purchased or payment) has been received at block 1102. For example, the payment allocation may include an allocation of a percentage of an amount of value to be provided by a plurality of users to pay for a selection of value (e.g., an item) purchased through use of the networked system 102 for a value due.

If payment allocation has been received, the payment allocation may be designated (e.g., for the collaborative session) at block 1124. If a determination is made at decision block 1122 that the payment allocation has not been received, a default payment allocation (e.g., equal portion of the designated users of the collaborative session, equal portion for the plurality of users of the collaborative session, an entire portion by the primary account, or differing portions based on the financial resources of the designated users) may be used for the designated account at block 1126. Upon completion of the operations at block 1124 or block 1126, the method 1100 may terminate.

In an example embodiment, a payment allocation designating a payment source of the plurality of sources during the operations at bock 1124 may be selected from the funding specification request received during the operations at block 1102.

In an example embodiment, performance of the method 1100 may providing a funding specification defining one or more payment sources and/or priority for providing value for a shopping session or other payment due.

Figure 12:
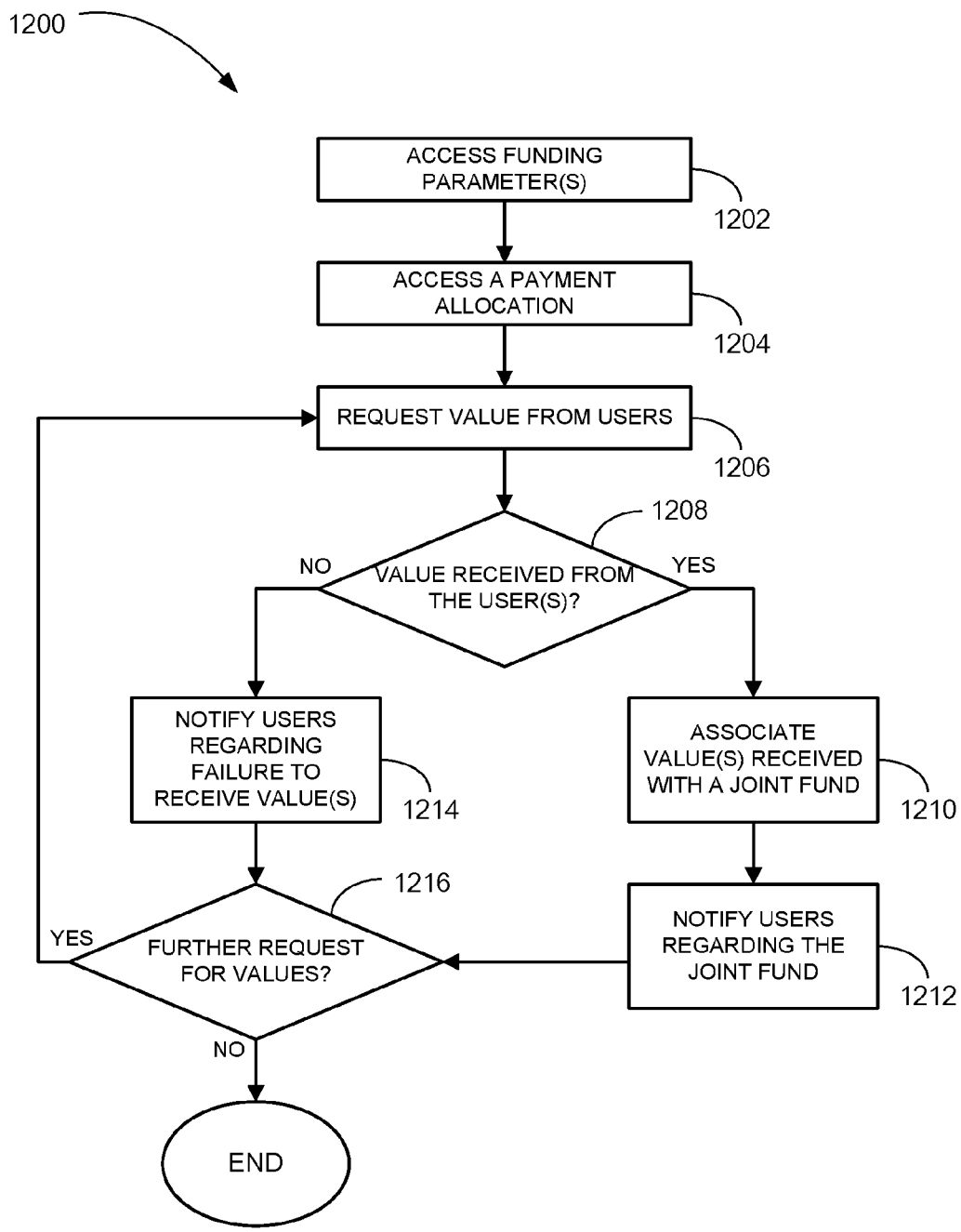
FIG. 12 is a flowchart illustrating a method for processing a joint fund establishment request according to an example embodiment.

Referring to FIG. 12, a method 1200 for processing a joint fund establishment request according to an example embodiment is illustrated. In an example embodiment, the method 1200 may be performed at block 726 (see FIG. 7) and/or by the funding application 236 (see FIG. 2).

One or more funding parameters (e.g., for a collaborative shopping session) may be accessed at block 1202. The funding parameters may include a value (e.g., a total value from all users or individual values from specific users) to be requested of users of the collaborative session, a value desired to start a session (e.g., a collaboration shopping session), and the like.

A payment allocation may optionally be accessed at block 1204. For example, the payment allocation may be received at block 1102 (see FIG. 11).

A value may be requested from the users of the session at block 1206. For example, the value may be requested from the users of the session according to the funding parameters and/or the accessed payment allocation.

A determination may be made at decision block 1208 as to whether value (e.g., one or more request values) has been received from the users. If a determination is made that value has been received from the users, the received values may be associated with a joint fund at block 1210. The users may then be notified of a status of the joint fund at block 1212. If a determination is made at decision block 1208 that the value has not been received from the users, the users may be notified regarding failure to receive value from the users at block 1214. Upon completion of the operations at block 1212 or block 1214, the method 1200 may proceed to decision block 1216.

At decision block 1216, a determination may be made as to whether a further request for value may be requested from one or more of the users. If a further requested is to be made, the method 1200 may return to block 1206. If a further request is not to be made, the method 1200 may terminate.

In an example embodiment, once the joint fund is established, users may further contribute further value to the joint fund.

Figure 13:
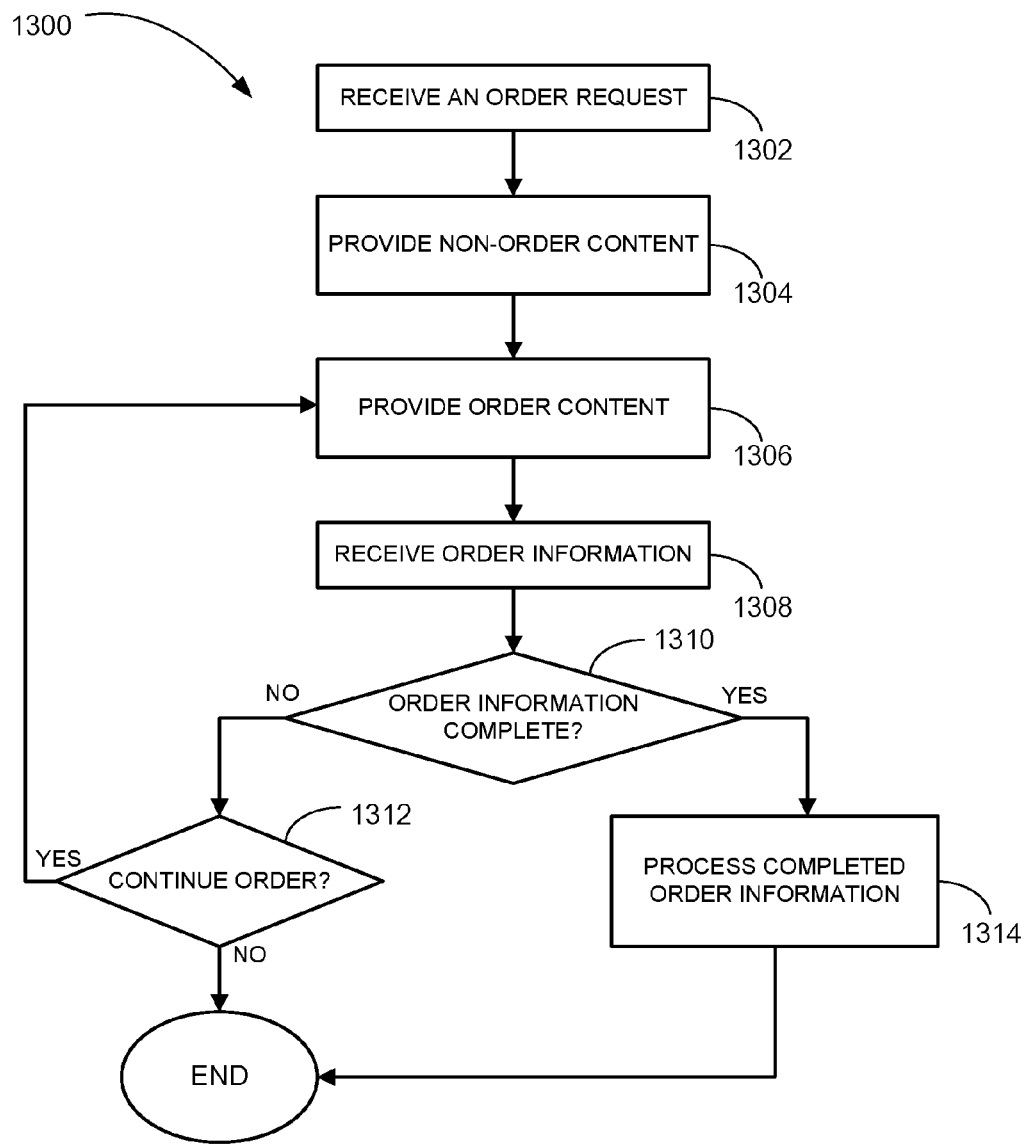
FIG. 13 is a flowchart illustrating a method for processing an order request according to an example embodiment.

Referring to FIG. 13, a method 1300 for processing an order request according to an example embodiment is illustrated. In an example embodiment, the method 1300 may be performed at block 722 (see FIG. 7).

An order request may be received at block 1302. The order request may be to purchase an item by a single user of the shopping session or by a plurality of users associated with the shopping session.

Non-order content may optionally be provided at block 1304. For example, the non-order content may be provided to all users that are not associated with the primary account, responsible for payment based on the payment allocation, and/or did not contribute to a joint fund for the shopping session. The non-order content may include a screen advising the non-ordering users to wait while the order is being completed, additional screens available for browsing, or the like.

Order content may be provided at block 1306. For example, the order content may be provided to all users that are associated with the primary account, responsible for payment based on the payment allocation, and/or contributed value to a joint fund for the shopping session. The order content may include information used by one or more users to complete an order (e.g., for a purchase of one or more fixed-price items and/or a bid for purchase of one or more items available via auction). It should be appreciated that the operations at block 1304 and 1306 may occur simultaneously or in any order.

Order information may be received at block 1308 from the users in response to the order content provided at block 1308. For example, the order information may complete information requested by the order content.

At decision block 1312, a determination may be made as to whether order information received is complete. If the requested order information is not complete, a determination may be made at decision block 1312 whether to continue processing the order request. If a determination is made at decision block 1312 to continue with the order request, the method 1300 may return to block 1306. If the determination is made at decision block 1312 not to continue with the order request, the method 1300 may terminate (e.g., the order request may be cancelled).

If the order information is complete at decision block 1310, the completed order information may be processed at block 1318. For example, the completed order information may include an amount due for the items associated with the shopping session. An example embodiment of processing the completed order information is described in greater detail below. Upon completion of the operations at block 1318, the method 1300 may terminate.

In an example embodiment, the order content provided at block 1306 may be provided to a user of the shopping session that has elected to purchase one or more items discovered during the shopping session individually. The content provided to other users at block 1304 of the shopping session may then include order content and/or non-order content for purchasing one or more items during the collaborative shopping session.

Figure 14:
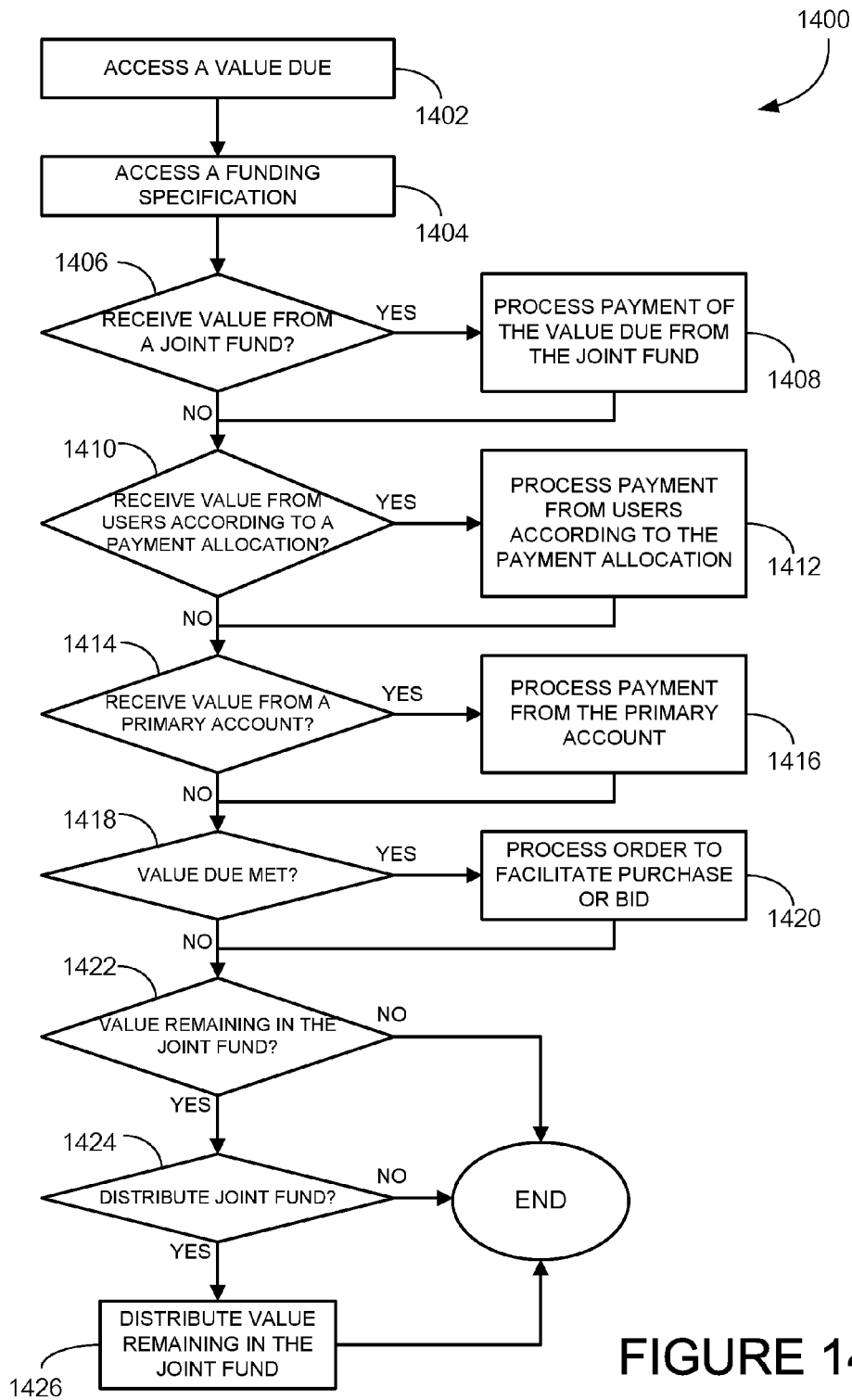
FIG. 14 is a flowchart illustrating a method for processing completed order information according to an example embodiment.

Referring to FIG. 14, a method 1400 for processing the completed order information according to an example embodiment is illustrated. In an example embodiment, the method 1400 may be performed at block 1314 (see FIG. 13) and/or by the funding application 236 (see FIG. 2).

A value due may be accessed at block 1402. For example, the value due may an amount due from a collaborative session or other amount due (e.g., rent due for an apartment).

A funding specification may be accessed at block 1404. For example, the funding specification may be defined during the operations of the method 1100 (see FIG. 11). The funding specification defines one or more payment sources and/or priority for providing value for a shopping session or other payment due.

A determination may be made at decision block 1406 as to whether value will be received from a joint fund. If value is received from a joint fund, the payment may be processed from the joint fund at block 1408. For example, the payment may cover an entire portion or a partial portion of the value due. If a determination is made that value will not be received from the joint fund at decision block 1406 or upon completion of the operations at block 1408, the method 1400 may proceed to decision block 1410.

At decision block 1410, a determination may be made as to whether value will be received from users according to a payment allocation. If value is received from users according to a payment allocation, payment may be processed according to the payment allocation at block 1412. If a determination is made that value will not be received from users according to the payment allocation at decision block 1410 or upon completion of the operations at block 1412, the method 1400 may proceed to decision block 1414.

A determination may be made at decision block 1414 as to whether value will be received from a primary account. If value is received from the primary account, payment may be processed from the primary account at block 1416. If a determination is made that value will not be received from the primary account at decision block 1414 or upon completion of the operations at block 1416, the method 1400 may proceed to decision block 1418.

At decision block 1418, a determination may be made as to whether the value due (e.g., for a selection of value) has been met by one or more payments. If the value due has been satisfied, the order may be processed to facilitate a purchase and/or a bid (e.g., of one or more items). If the value dues has not been met at decision block 1418 or upon completion of the operations at block 1420, the method 1400 may proceed to decision block 1422.

A determination may be made at decision block 1422 as to whether value remains in the joint fund. If value remains in the joint fund, a determination may be made at decision block 1424 as to whether the joint fund should be distributed. If a determination is made that the joint fund should be distributed, the value remaining in the joint fund may be distributed at block 1426. If a determination is made that the joint fund should not be distributed (e.g., the joint fund may be retained for a future shopping session) at decision block 1424, that there is no value remaining in the joint fund at decision block 1422, or upon completion of the operations at block 1426, the method 1400 may terminated.

In an example embodiment, the operations at decision block 1422, decision block 1424, and block 1426 may be skipped after completion the operations at decision block 1418 or block 1420.

Figure 15:
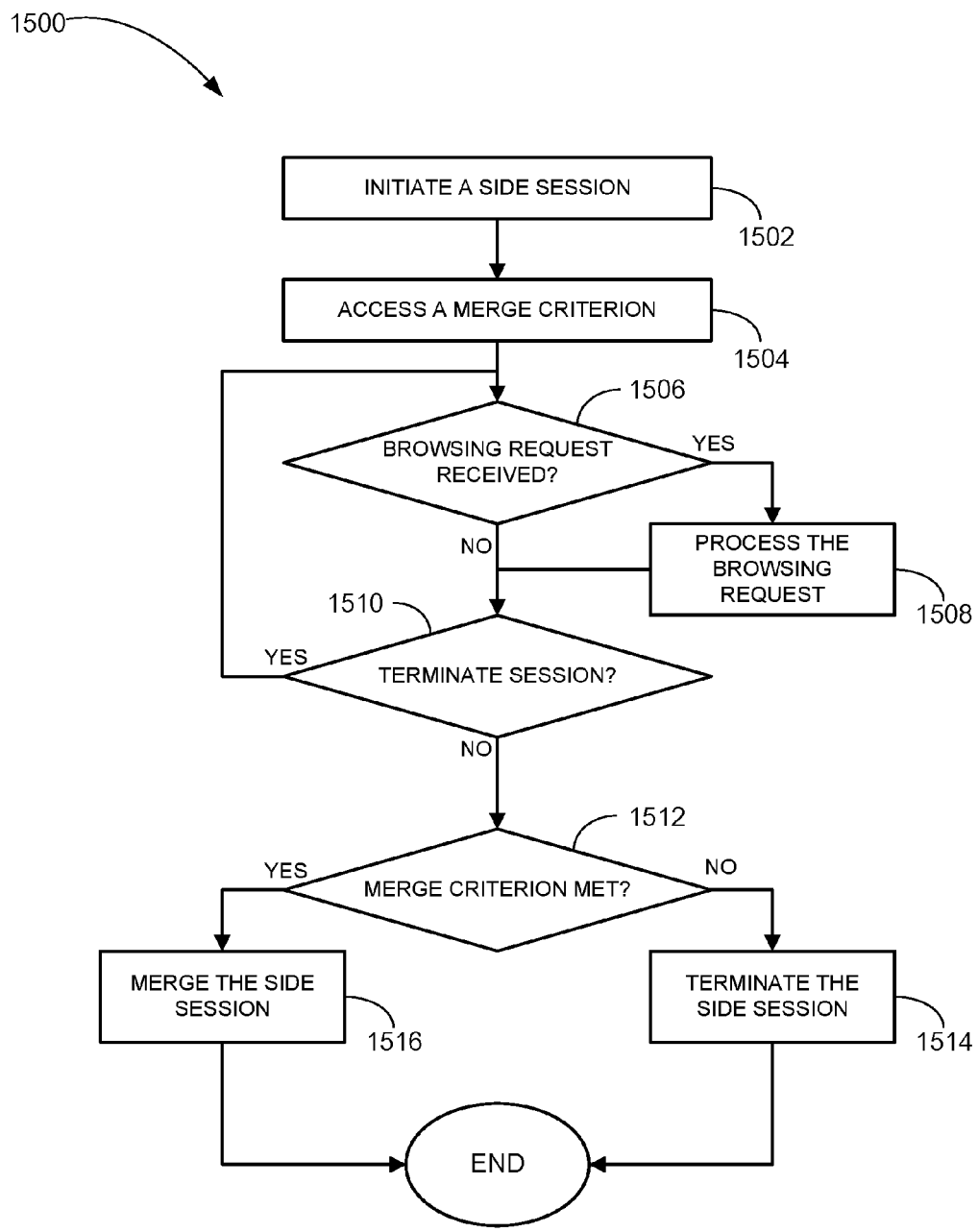
FIG. 15 is a flowchart illustrating a method for conducting a side session according to an example embodiment.

Referring to FIG. 15, a method 1500 for conducting a side session (e.g., a side shopping session) according to an example embodiment is illustrated. In an example embodiment, the method 1500 may be performed at block 518 (see FIG. 5).

A side session may be initiated at block 1502. For example, initiation of the side session may include providing a user of the side session an additional interface and/or a portion of an existing interface in which user activity of the user may not be shared with other users of the plurality of users.

A merge criterion may be accessed for the collaborative session at block 1504. For example, the merge criterion may be defined for the collaborative session at block 502 (see FIG. 5).

At decision block 1506, a determination may be made as to whether a browsing request has been received. If a browsing request has been received, the browsing request may be processed at block 1508. In an example embodiment, the operations at block 1508 may include the operations performed at the block 606 (see FIG. 6). If a browsing request has not been received at decision block 1506 or upon completion of the operations at block 1508, the method 1500 may proceed to decision block 1510.

A determination may be made at decision block 1510 whether to terminate the side session. If the side session is to continue, the method 1500 may return to decision block 1506. If the side session is to terminate at decision block 1510, the method 1500 may proceed to decision block 1512.

At decision block 1512, a determination may be made as to whether a merge criterion is met. The merge criterion may be used to determine whether the side session of the user may be merged with the collaborative session. For example, the merge criterion may be that a user of the side session has requested a merge, the user of the side session has requested a merge and the merge has been approved by some (or all) of the participants of the collaborative session, current content of the side session is related to the current content of the collaborative session, the current content of the side session is related to an area of interest of the collaborative session, and the like If the merge criterion is met, the side session and the collaborative session may be merged at block 1516. For example, the content of the side session may supplant the content of the collaborative session during a merge. If the merge criterion is not met at decision block 1512, the side session may terminate at block 1514. Upon completion of the operations at block 1514 or block 1516, the method 1500 may terminate.

In an example embodiment, a user may identify content while engaged in the side session and identified through browsing requests that the user seeks to share with the other participants of the collaborative session. If the user seeks to share the identified content with the other participants, the method 1500 may proceed to decision block 1512 to determine whether merge criterion is met. If the user does not seek to share the identified content, the method 1500 may terminate after a determination is made to terminate the side session at decision block 1510.

Figure 16:
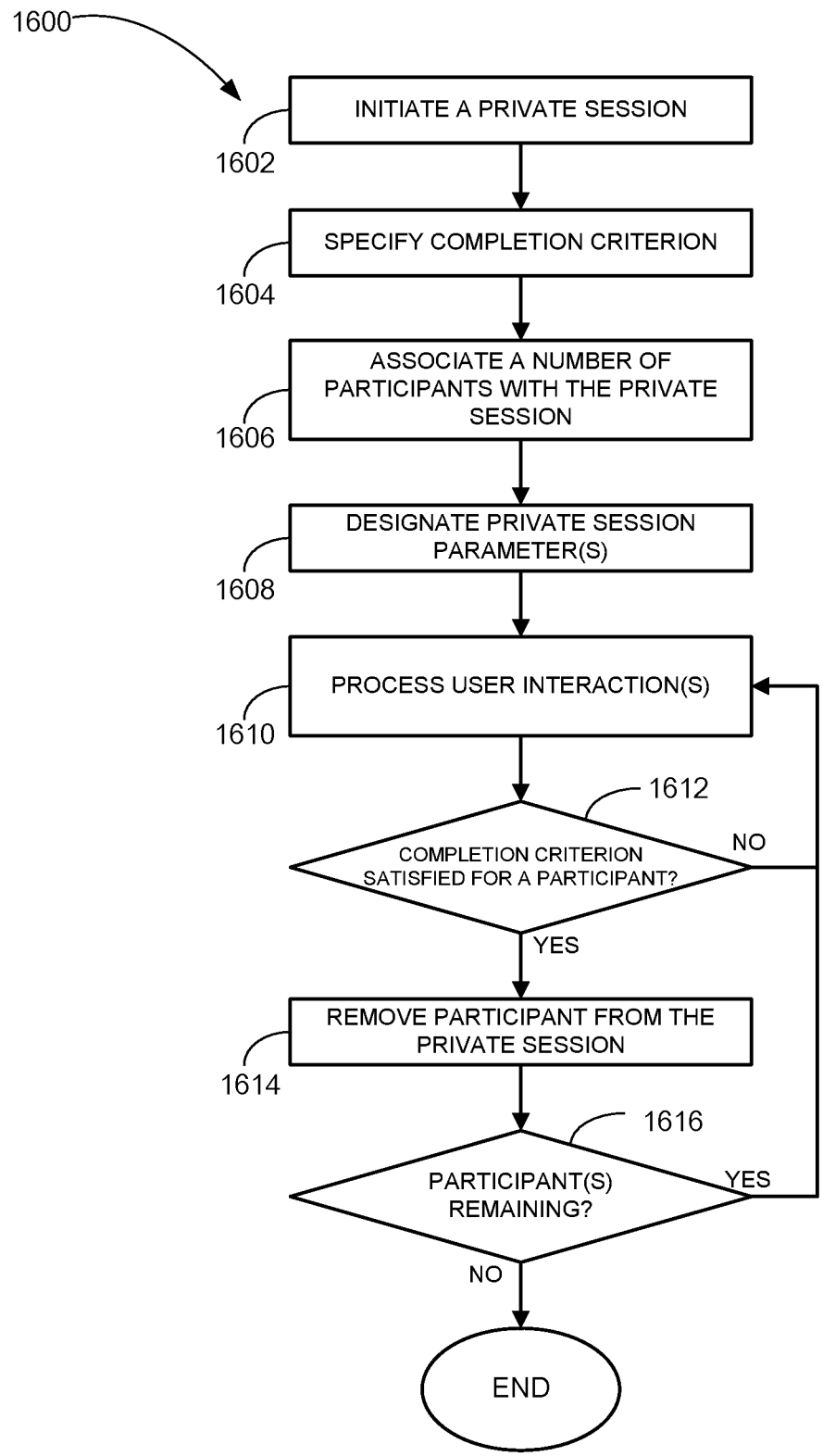
FIG. 16 is a flowchart illustrating a method for conducting a collaborative session according to an example embodiment.

Referring to FIG. 16, a method 1600 for conducting a private session (e.g., a private shopping session) according to an example embodiment is illustrated. In an example embodiment, the method 1600 may be performed at block 410 (see FIG. 4) and/or by the shopping session application 234 (see FIG. 2).

A private session (e.g., a private shopping session) may be initiated at block 1602. A private session includes a session for one or more users in which each of the users of the private session have special access to items (e.g., access to items not otherwise available) or access to items at a special price (e.g., discounted or free), and the like.

One or more completion criterion may be specified for the private session at block 1604. For example, the completion criterion may include purchase (e.g., at a value paid by the user and/or a fair market value of the items) of a predetermined number of items during the session, purchase of a select item during the session, purchases of one or more items totaling a certain value during the session, expiration of a period of time for the session, a specified time, and the like.

A number of participants (e.g., users selected for participation) may be associated with the private session at block 1606. For example, the number of participants may be selected for association based on past history within the networked system 102, one or more sellers within the networked system 102, purchase of one or more items within the networked system 102, the status of the participants (e.g., as a celebrity attending an event for which the celebrity obtains one or more free items), and the like. In an example embodiment, the participants participate privately and not collaboratively during the private session.

Private session parameters may be designated for the private session at block 1608. For example, the private session parameters may include designating credit available for participants of the private session, designating areas available during the private session, designating items available for purchase during the private session, designating seller for the private session, designating stores for the private session, designating pricing for the private session, and the like. An example embodiment of designating the private session parameters is described in greater detail below.

One or more user interactions may be processed at block 1610. In an example embodiment, the operations at block 514 (see FIG. 5) may be performed at block 1610. For example, communications, cursor movement requests, indication requests, execution requests, and order requests may be processed for the private session at block 1610.

A determination may be made at block 1612 as to whether completion criterion has been satisfied for a participant of the private session. If the completion criterion has not been satisfied for a participant of the private session, the method 1600 may return to block 1610. If the completion criterion has been satisfied for a participant, the participant with the satisfied completion criterion may be removed from the private session at block 1614.

A determination may be made at decision block 1616 as to whether one or more participants remain with the private session. If participants remain with the private session, the method 1600 may return to block 1610. If no participants remain at decision block 1616, the method 1600 may terminate.

Figure 17:
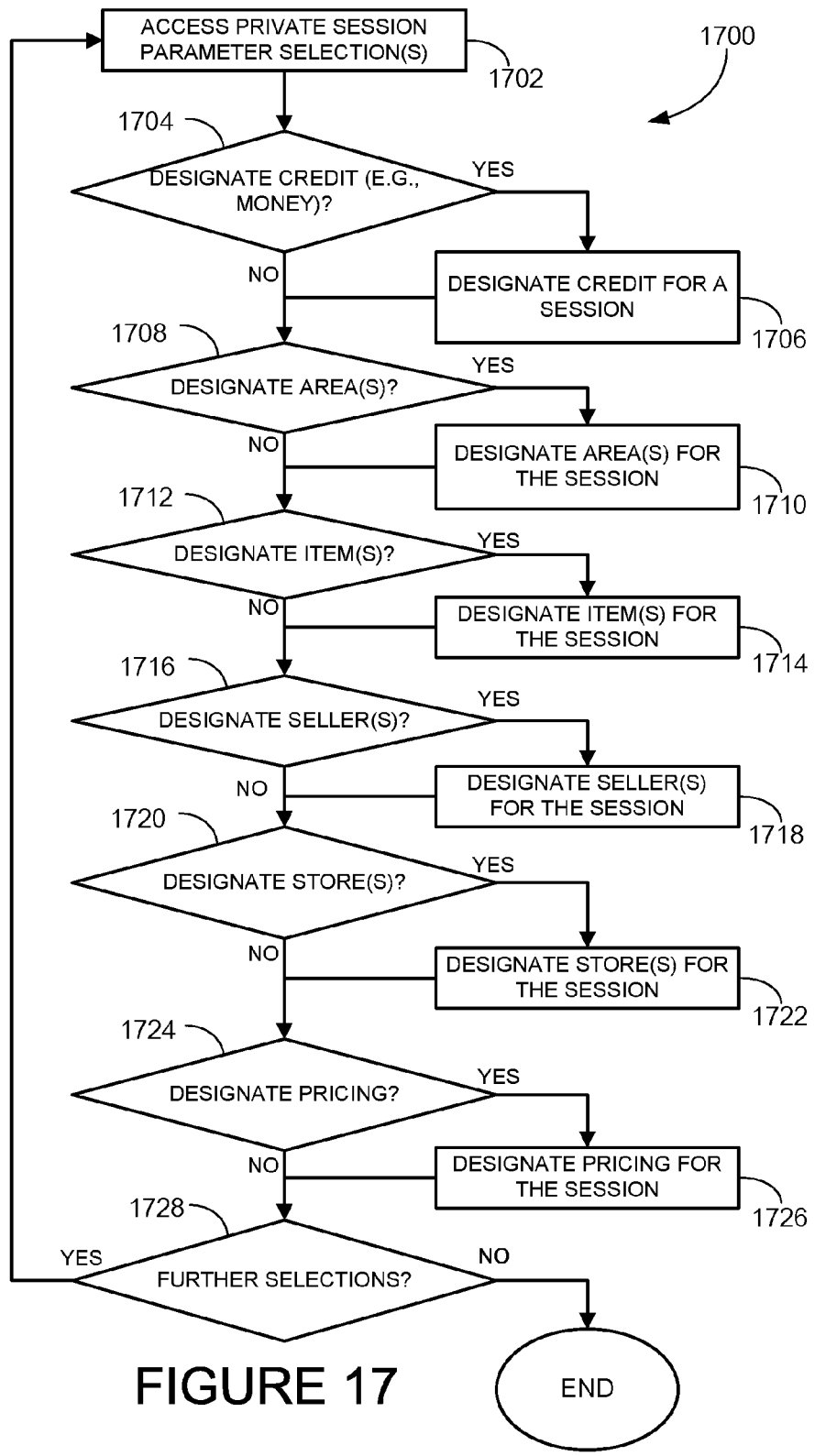
FIG. 17 is a flowchart illustrating a method for designating session parameters according to an example embodiment.

Referring to FIG. 17, a method 1700 for designating session parameters according to an example embodiment is illustrated. In an example embodiment, the method 1700 may be performed at block 1608 (see FIG. 16).

One or more private session parameter selections may be accessed (e.g., from a user) at block 1702.

A determination may be made at decision block 1704 as to whether credit may be designated. For example, the credit may include an accumulated value available (e.g., a same credit or a different credit) to each of the number of participants of the private shopping session. If credit is to be designated, the credit may be designated for participants of the session at block 1706. If a determination is made not to designate credit at decision block 1704 or upon completion of the operations at block 1706, the method 1700 may proceed to decision block 1708.

At decision block 1708, a determination may be made whether to designate an area. If areas are to be designated, the areas for the session may be designated at block 1710. For example, one or more areas of a site in which to shop during the private session may be designated at block 1710. If a determination is made not to designate the one or more areas at decision block 1708 or upon completion of the operations at 1710, the method 1700 may proceed to decision block 1712.

A determination may be made at decision block 1712 as to whether one or more items may be designated. If one or more items are to be designated, one or more items may be designated for the session at block 1714. For example, one or more items may be designated as being available for purchase during the private session. If a determination is made not to designate one or more items at decision block 1712 or upon completion of the operations at block 1714, the method 1700 may proceed to decision block 1716.

At decision block 1716, a determination may be made whether to designate one or more sellers. If one or more sellers are to be designated, one or more sellers may be designated for the session at block 1718. For example, one or more sellers that have made an item available for purchase during the private session may be designated at block 1718. If a determination is made not to designate one or more sellers at decision block 1716 or upon completion of the operations at block 1718, the method 1700 may proceed to decision block 1720.

A determination may be made at decision block 1720 whether to designate one or more stores. If one or more stores are to be designated, one or more stores may be designated for the session at block 1722. For example, one or more stores may have one or more items available for purchase during the private shopping session. If a determination is made not to designate one or more stores at decision block 1720 or upon completion of the operations at block 1722, the method 1700 may proceed to decision block 1724.

At decision block 1724, a determination may be made whether to designate pricing for the private session. If pricing is to be designated, the pricing may be designated for the private session at block 1726. For example, special pricing (e.g., at a discount or free) for an item may be designated at block 1726. If a determination is made that pricing is not to be designated at decision block 1724 or upon completion of the operations at block 1726, the method 1700 may proceed to decision block 1728.

A determination may be made at decision block 1728 whether there are further selections for access. If there are further selections for access, the method 1700 may return to block 1702. If there are no further selections, the method 1700 may terminate.

Figure 18:
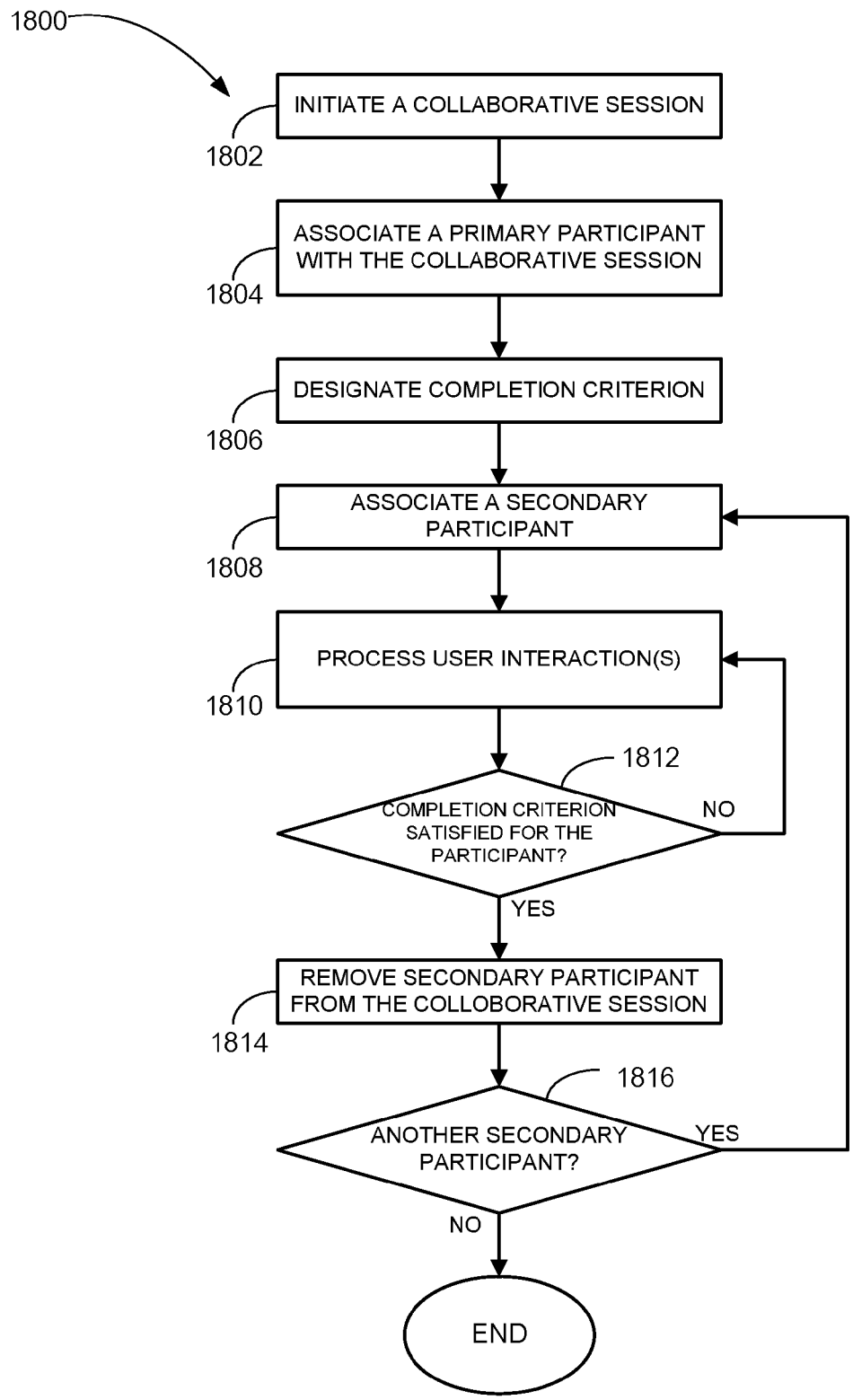
FIG. 18 is a flowchart illustrating a method for conducting a private session according to an example embodiment.

Referring to FIG. 18, a method 1800 for conducting a collaborative session according to an example embodiment is illustrated. In an example embodiment, the method 1800 may be performed at block 406 (see FIG. 4) and/or by the shopping session application 234 (see FIG. 2).

A collaborative session (e.g., a collaborative shopping session) may be initiated at block 1802. For example, the collaborative session may include multiple participants interacting on a common interface.

A primary participant for the collaborative session may be selected at block 1804. For example, the primary participant may include a sponsor of a collaborative session, a user responsible for payment of any items purchased during the collaborative session, a user performing a demonstration for another user, a parent, a celebrity, and the like.

A completion criterion may be designated at block 1806. For example, the completion criterion may include a purchase (e.g., at a value paid by the user and/or a fair market value of the items) of a predetermined number of items during the session, purchase of a select item during the session, purchases of one or more items totaling a certain value during the session, expiration of a period of time for the session, a specified time, and the like.

One or more secondary participants may be selected at block 1808. For example, the secondary participant may include a sponsored user of a collaborative session, a user not responsible for payment of any items purchased during the collaborative session, a user receiving a demonstration from another user, a child, a fan of a celebrity, and the like.

A number of user interactions (e.g., from the primary participant and/or the secondary participant) may be processed at block 1810. In an example embodiment, the operations at block 514 (see FIG. 4) may be performed at block 1810. For example, communications, cursor movement requests, indication requests, execution requests, and order requests may be processed for the private session at block 1810.

A determination may be made at decision block 1812 as to whether the completion criterion has been satisfied. If the completion criteria has not been satisfied, the method 1800 may return to block 1810. If the completion criterion has been satisfied at decision block 1812, the secondary participant may be removed from the collaborative session at block 1814. For example, the private session may be terminated for a participant of the private session when the completion criterion is satisfied.

At decision block 1816, a determination may be made as to whether there is another secondary participant. If there is another secondary participant, the method 1800 may return to block 1808. If there is not another secondary participant, the method 1800 may terminate.

Figure 19:
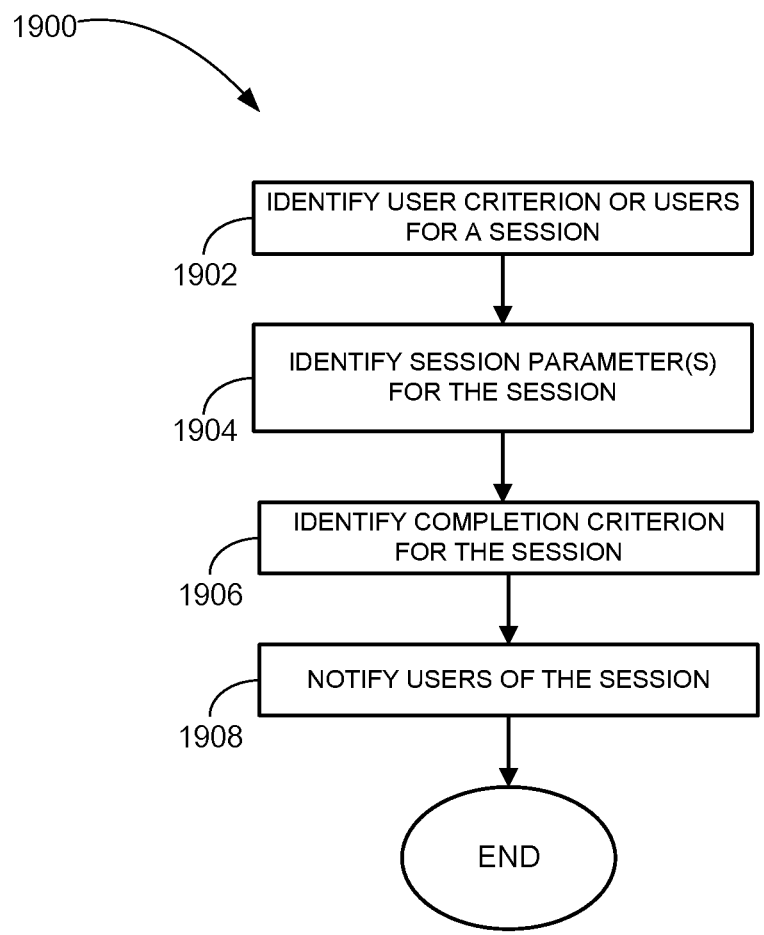
FIG. 19 is a flowchart illustrating a method for creating a session according to an example embodiment.

Referring to FIG. 19, a method 1900 for creating a session according to an example embodiment is illustrated. In an example embodiment, the method 1900 may be performed on the client machine 110, 112 and/or on the third party service 130 (see FIG. 1).

A user criteria and/or one or more users may be specified for a session at block 1902. For example, the user criteria and/or one or more users may be provided to the shopping session application 234 (see FIG. 2). Session parameters may be specified for the session at block 1904. A completion criterion may be identified at block 1906.

Users associated with the session may be notified of the session at block 1910. For example, the users may be provided with a password and/or other information to access the session. Upon completion of the operations at block 1910, the method 1900 may terminate.

Figure 20:
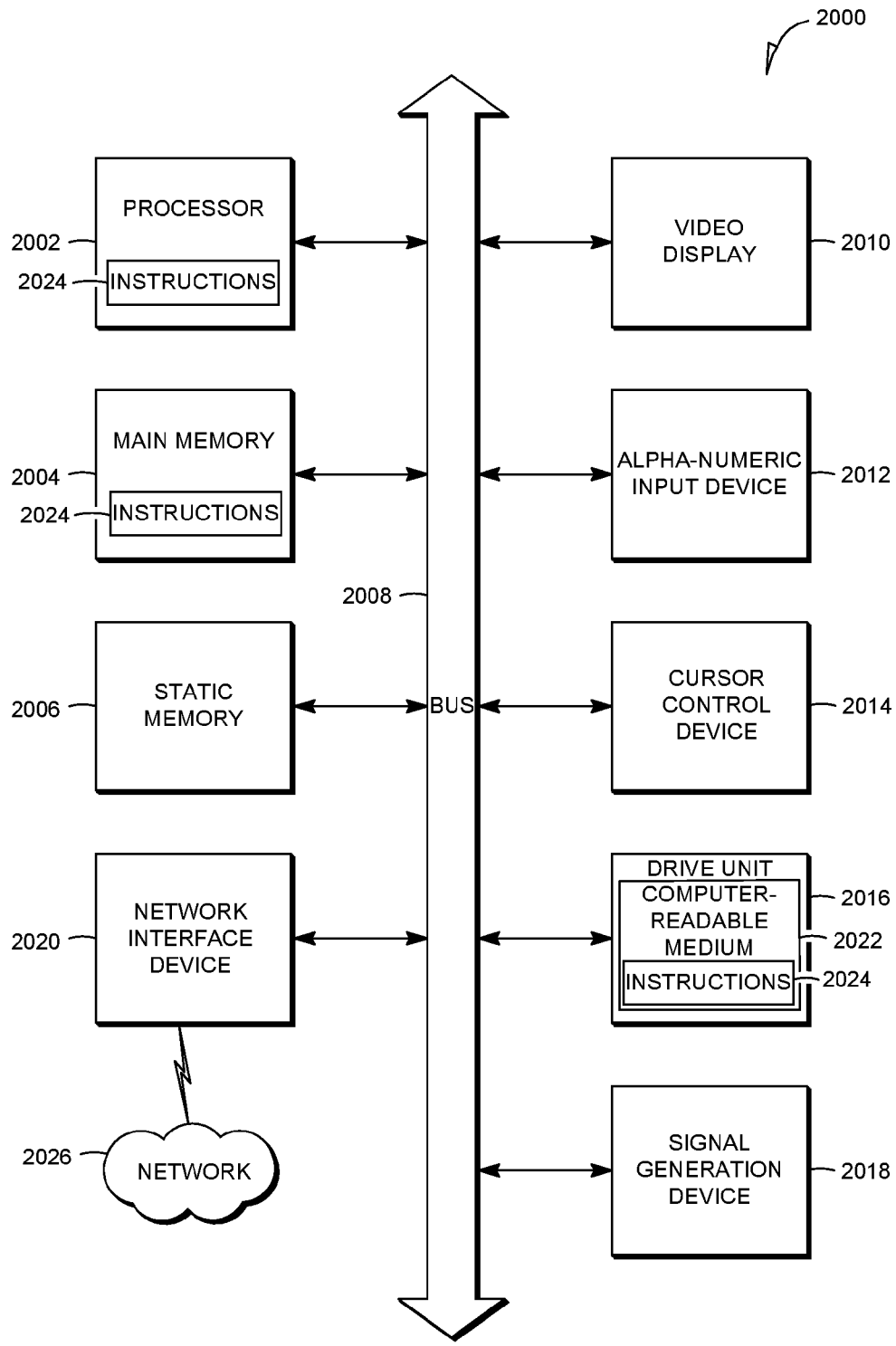
FIG. 20 is a block diagram diagrammatic representation of machine in the example form of a computer system within which a set of instructions, for causing the machine to perform any one or more of the methodologies discussed herein, may be executed.

FIG. 20 shows a diagrammatic representation of machine in the example form of a computer system 2000 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2000 includes a processor 2002 (e.g., a central processing unit (CPU) a graphics processing unit (GPU) or both), a main memory 2004 and a static memory 2006, which communicate with each other via a bus 2008. The computer system 2000 may further include a video display unit 2010 (e.g., a liquid crystal display (LCD) or a cathode ray tube (CRT)). The computer system 2000 also includes an alphanumeric input device 2012 (e.g., a keyboard), a cursor control device 2014 (e.g., a mouse), a drive unit 2016, a signal generation device 2018 (e.g., a speaker) and a network interface device 2020.

The drive unit 2016 includes a machine-readable medium 2022 on which is stored one or more sets of instructions (e.g., software 2024) embodying any one or more of the methodologies or functions described herein. The software 2024 may also reside, completely or at least partially, within the main memory 2004 and/or within the processor 2002 during execution thereof by the computer system 2000, the main memory 2004 and the processor 2002 also constituting machine-readable media.

The software 2024 may further be transmitted or received over a network 2026 via the network interface device 2020.

While the machine-readable medium 2022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

While the following description has been described in terms of shopping sessions, it will be appreciated that the collaborative, private, and side sessions may be conducted for purposes beyond shopping.

Thus, a method and system for payment funding have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    associating a plurality of users with a collaborative session that includes displaying a common interface to the plurality of users, the common interface displaying a shared cursor;
    receiving a private shopping session request from a user of the collaborative shopping session;
    associating the user with a private shopping session in response to the private shopping session request, the private shopping session allowing access to an item at a special price, the special price different than prices available to non-participants of the private shopping session;
    designating a criterion for the private shopping session, the criterion indicating a completion of the private shopping session for the user;
    processing, using one or more processors, user interactions received from a device operated by the user according to the private shopping session in response to the association between the user and the private shopping session;
    determining that the criterion is satisfied as a result of the processing; and
    concluding the private shopping session for the user based on the determination.

2. The method of claim 1, wherein the completion criterion includes at least one of:
    purchase of a predetermined number of items during the private shopping session;
    purchase of a select item during the private shopping session;
    purchases of one or more items totaling a certain value during the private shopping session;
    determining an expiration of a period of time for the private shopping session; or
    determining a specified time for the private shopping session.

3. The method of claim 1, further comprising:
    designating parameters for the private shopping session, the parameters including:
    credit for each participant of the private shopping session, an area of a site in which to shop during the private shopping session, an item available for purchase during the private shopping session, a seller that has made the item available for purchase during the private shopping session, a store in which the item is available for purchase during the private shopping session, or special pricing for an item during the private shopping session.

4. The method of claim 1, wherein:

the private shopping session includes a plurality of further users; and the plurality of further users remain in the private shopping session after concluding the private shopping session for the user.

5. The method of claim 1, further comprising:

receiving an order request from the device operated by the user; and wherein the processing the user interactions includes processing the order request.

6. The method of claim 1, further comprising:

receiving a communication from the device operated by the user; and wherein the processing the user interactions includes processing the communication received from the device operated by the user.

7. The method of claim 1, further comprising:

receiving a browsing request from the device operated by the user; and wherein the processing the user interactions includes processing the browsing request received from the device operated by the user.

8. The method of claim 7, further comprising:

receiving a cursor movement request from two or more users of the private shopping session; and processing the movement request from a first user selected from the two or more users, the first user being selected based on satisfaction of movement criterion.

9. The method of claim 8, wherein the movement criterion includes at least one of:

the first user having a highest authority level;

the first user being an only user to not have the movement request processed if the two or more users share a same authority level; or control designated from a second user of the at least two users.

10. A system comprising:

one or more processors; and a memory storing instructions that, when executed by the one or more processors, cause the one or more processors to perform operations comprising:

associating a plurality of users with a collaborative session that includes displaying a common interface to the plurality of users, the common interface displaying a shared cursor;

receiving a private shopping session request from a user of the collaborative shopping session;

associating the user with a private shopping session in response to the private shopping request, the private shopping session allowing access to an item at a special price, the special price different than prices available to non-participants of the private shopping session;

designating a criterion for the private shopping session, the criterion indicating a completion of the private shopping session for the user;

processing user interactions received from a device operated by the user according to the private shopping session in response to the association between the user and the private shopping session;

determining that the criterion is satisfied as a result of the processing; and concluding the private shopping session for the user based on the determination.

11. The system of claim 10, wherein the completion criterion includes at least one of:

purchase of a predetermined number of items during the private shopping session;

purchase of a select item during the private shopping session;

purchases of one or more items totaling a certain value during the private shopping session;

determining an expiration of a period of time for the private shopping session; or determining a specified time for the private shopping session.

12. The system of claim 10, wherein the operations further comprise:

designating parameters for the private shopping session, the parameters including:

credit for each participant of the private shopping session, an area of a site in which to shop during the private shopping session, an item available for purchase during the private shopping session, a seller that has made the item available for purchase during the private shopping session, a store in which the item is available for purchase during the private shopping session, or special pricing for an item during the private shopping session.

13. The system of claim 10, wherein:

the private shopping session includes a plurality of further users; and the plurality of further users remain in the private shopping session after concluding the private shopping session for the user.

14. The system of claim 10, wherein the operations further comprise:

receiving an order request from the device operated by the user; and wherein the processing the user interactions includes processing the order request.

15. The system of claim 10, wherein the operations further comprise:

prior to receiving the request, associating the plurality of users with a collaborative shopping session, the collaborative shopping session including a common interface that is shared among the plurality of users.

16. The system of claim 10, wherein the operations further comprise:

receiving a communication from the device operated by the user; and wherein the processing the user interactions includes processing the communication received from the device operated by the user.

17. The system of claim 10, wherein the operations further comprise:

receiving a browsing request from the device operated by the user; and wherein the processing the user interactions includes processing the browsing request received from the device operated by the user.

18. The system of claim 17, wherein the operations further comprise:

receiving a cursor movement request from two or more users of the private shopping session; and processing the movement request from a first user selected from the two or more users, the first user being selected based on satisfaction of movement criterion.

19. A non-transitory machine-readable medium storing instructions that, when executed by one or more processors of a machine, cause the machine to perform operations comprising:

associating a plurality of users with a collaborative session that includes displaying a common interface to the plurality of users, the common interface displaying a shared cursor;

receiving a private shopping session request from a user of the collaborative shopping session;

associating the user with a private shopping session in response to the private shopping request, the private shopping session allowing access to an item at a special price, the special price different than prices available to non-participants of the private shopping session;

designating a criterion for the private shopping session, the criterion indicating a completion of the private shopping session for the user;

processing user interactions received from a device operated by the user according to the private shopping session in response to the association between the user and the private shopping session;

determining that the criterion is satisfied as a result of the processing; and concluding the private shopping session for the user based on the determination.

20. The method of claim 1, further comprising selecting a movement of the shared cursor from among inputs from at least a portion of the plurality of users based on authority levels of each of the at least a portion of the plurality of users.

21. The method of claim 20, wherein the selecting of the movement is from among inputs from the portion of users meeting a threshold authority level.

22. The method of claim 1, further comprising selecting a second plurality of users for association with the private shopping session based on a past history of the second plurality of users.

* * * * *

UNITED STATES PATENT AND TRADEMARK OFFICE
CERTIFICATE OF CORRECTION

| | |
|---|---|
| PATENT NO. | : 9,972,039 B2 |
| APPLICATION NO. | : 15/175911 |
| DATED | : May 15, 2018 |
| INVENTOR(S) | : Helen M. Gould et al. |

It is certified that error appears in the above-identified patent and that said Letters Patent is hereby corrected as shown below:

On the Title Page

In item (72), in Column 1, in "Inventors", Line 5, delete "ALvaro" and insert -- Alvaro --, therefor.

Under "(*) Notice:", in Column 1, Line 3, delete "0 days. days." and insert -- 0 days. --, therefor.

Signed and Sealed this
Twelfth Day of February, 2019

Andrei Iancu
*Director of the United States Patent and Trademark Office*